United States Patent
Piper et al.

(10) Patent No.: US 11,693,527 B2
(45) Date of Patent: Jul. 4, 2023

(54) ADJUSTING AN INTERFACE BASED ON A COGNITIVE MODE

(71) Applicant: eBay Inc., San Jose, CA (US)

(72) Inventors: Shawn Piper, Beaverton, OR (US); Mark Joseph Eppolito, Portland, OR (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/405,313

(22) Filed: Aug. 18, 2021

(65) Prior Publication Data

US 2021/0373716 A1    Dec. 2, 2021

Related U.S. Application Data

(63) Continuation of application No. 14/823,617, filed on Aug. 11, 2015, now Pat. No. 11,137,870.

(51) Int. Cl.
*G06F 3/0481* (2022.01)
*G06Q 30/0601* (2023.01)
*G06F 9/451* (2018.01)
*H04L 67/50* (2022.01)

(52) U.S. Cl.
CPC ............ *G06F 3/0481* (2013.01); *G06F 9/451* (2018.02); *G06Q 30/0641* (2013.01); *H04L 67/535* (2022.05)

(58) Field of Classification Search
CPC .. G06F 3/0482; G06F 3/04886; G06F 3/0481; G06F 9/451; G06Q 30/0641; G06Q 30/0631; G06Q 30/0253; H04L 67/22
See application file for complete search history.

(56) References Cited

U.S. PATENT DOCUMENTS

| | | | |
|---|---|---|---|
| 6,222,541 B1* | 4/2001 | Bates | G06F 3/0481 |
| | | | 715/974 |
| 7,113,917 B2 | 9/2006 | Jacobi et al. | |
| 7,676,400 B1* | 3/2010 | Dillon | G06Q 30/0631 |
| | | | 705/26.7 |
| 8,095,582 B2 | 1/2012 | Cramer | |
| 8,548,876 B1 | 10/2013 | Fox et al. | |
| 8,775,332 B1 | 7/2014 | Morris et al. | |
| 8,818,788 B1 | 8/2014 | Mihalik et al. | |

(Continued)

FOREIGN PATENT DOCUMENTS

WO    2017/027607 A1    2/2017
WO    2017/028098 A1    2/2017

OTHER PUBLICATIONS

Final Office Action Received for U.S. Appl. No. 14/823,617 dated Dec. 20, 2018, 21 pages.

(Continued)

*Primary Examiner* — Eric J Yoon
(74) *Attorney, Agent, or Firm* — FIG. 1 Patents

(57) ABSTRACT

In various example embodiments, a system and method for adjusting a user interface according to a cognitive mode is disclosed. In one example embodiment, a method includes receiving a plurality of user events based on a user interacting with a system, determining a cognitive operating mode of the user based on the user events, with the cognitive operating mode selected from a predefined set of cognitive operating modes, and modifying a user interface element according to the cognitive operating mode of the user.

20 Claims, 21 Drawing Sheets

(56) References Cited

U.S. PATENT DOCUMENTS

| | | | | |
|---|---|---|---|---|
| 9,691,096 | B1* | 6/2017 | Dai | G06Q 30/0631 |
| 9,912,768 | B1* | 3/2018 | Choi | H04L 67/22 |
| 10,332,181 | B1* | 6/2019 | McAllister | G06F 16/24578 |
| 11,137,870 | B2 | 10/2021 | Piper et al. | |
| 2003/0046401 | A1 | 3/2003 | Abbott et al. | |
| 2005/0086187 | A1 | 4/2005 | Grosser et al. | |
| 2006/0136821 | A1* | 6/2006 | Barabe | G06F 40/197 |
| | | | | 707/999.001 |
| 2008/0189608 | A1* | 8/2008 | Nurmi | G06F 40/169 |
| | | | | 715/256 |
| 2009/0319910 | A1* | 12/2009 | Escapa | G06F 16/258 |
| | | | | 707/999.201 |
| 2012/0022946 | A1 | 1/2012 | Pan | |
| 2013/0046772 | A1 | 2/2013 | Gu et al. | |
| 2013/0097490 | A1* | 4/2013 | Kotler | G06F 16/4393 |
| | | | | 715/255 |
| 2013/0152001 | A1 | 6/2013 | Lovitt et al. | |
| 2013/0346396 | A1 | 12/2013 | Stamm et al. | |
| 2014/0027846 | A1 | 1/2014 | Cha et al. | |
| 2014/0380263 | A1 | 12/2014 | Gabel et al. | |
| 2015/0081611 | A1 | 3/2015 | Shivakumar | |
| 2015/0332372 | A1 | 11/2015 | Hariri et al. | |
| 2016/0034166 | A1* | 2/2016 | Wilson | G06F 3/0482 |
| | | | | 715/771 |
| 2016/0042279 | A1 | 2/2016 | Wong et al. | |
| 2016/0234268 | A1* | 8/2016 | Ouyang | H04L 67/54 |
| 2017/0046011 | A1 | 2/2017 | Piper et al. | |
| 2017/0316092 | A1* | 11/2017 | Fichter | G06F 16/958 |

OTHER PUBLICATIONS

Final Office Action received for U.S. Appl. No. 14/823,617, dated Aug. 1, 2019, 18 pages.

Final Office Action Received for U.S. Appl. No. 14/823,617, dated Apr. 20, 2020, 33 Pages.

Non Final Office Action Received for U.S. Appl. No. 14/823,617, dated Dec. 17, 2019, 27 pages.

Non Final Office Action Received for U.S. Appl. No. 14/823,617, dated Feb. 12, 2021, 30 Pages.

Non-Final Office Action received for U.S. Appl. No. 14/823,617, dated Aug. 6, 2018, 18 pages.

Non-Final Office action received for U.S. Appl. No. 14/823,617 dated Mar. 21, 2019, 19 pages.

Notice of Allowance Received for U.S. Appl. No. 14/823,617, dated Jun. 1, 2021, 14 Pages.

Merriam Webster,"Definition of cognitive", Retrieved from internet URL: https://www.merriam-webster.com/dictionary/cognitive, 1828, 12 Pages, downloaded Sep. 24, 2021.

Merriam Webster,"Definition of marketplace", Retrieved from internet URL: https://www.merriam-webster.com/dictionary/marketplace, 1828, 12 Pages, downloaded Sep. 24, 2021.

International Preliminary Report on Patentability received for PCT Application No. PCT/US2016/046379, dated Feb. 22, 2018, 8 pages.

International Search Report received for PCT Application No. PCT/US2016/046379, dated Oct. 21, 2016, 2 pages.

International Written Opinion received for PCT Application No. PCT/US2016/046379, dated Oct. 21, 2016, 6 pages.

Stuff,"How to Buy Items on Amazon.com", YouTube Video, Retrieved from internet URL: https://www.youtube.com/watch?v=kj9cOYRUeyY, Jan. 3, 2016, 1 Page.

* cited by examiner

ADJUSTING AN INTERFACE BASED ON A COGNITIVE MODE

RELATED APPLICATIONS

This application is a continuation of and claims priority to U.S. patent application Ser. No. 14/823,617, filed Aug. 11, 2015, entitled "Adjusting an Interface Based On a Cognitive Mode", the entire disclosure of which is hereby incorporated by reference herein in its entirety.

TECHNICAL FIELD

Embodiments of the present disclosure relate generally to graphical user interfaces and, more particularly, but not by way of limitation, to adjusting an interface based on a cognitive mode.

BACKGROUND

Conventionally, a user interface is organized by a developer to effectively communicate with a user. Locations, sizes, fonts, and other properties of a user interface element effect how the user interacts with the system presenting the interface. Typically, users communicate with such a system using one of two different cognitive modes. According to a dual mode of cognitive processing, users operate in either a heuristic cognitive operating mode or a systematic cognitive mode.

Users who are more familiar with a certain interface, or are pressed for time, will sometimes operate in a heuristic cognitive operating mode and fail to review relevant or important information. In certain examples, users operating in a heuristic cognitive operating mode engage in commitments or transactions without being aware of applicable conditions of the commitment or transaction.

In other examples, a user is unfamiliar with an interface or may be excessively worried about a certain commitment or transaction. In these examples, a user typically is operating in a systematic cognitive operating mode and may perform an exhaustive review of relevant information. In this example, the user may not engage in a commitment or transaction in a timely manner, thereby resulting in reduced transaction levels for the system.

BRIEF DESCRIPTION OF THE DRAWINGS

Various ones of the appended drawings merely illustrate example embodiments of the present disclosure and cannot be considered as limiting its scope.

Figure 1:
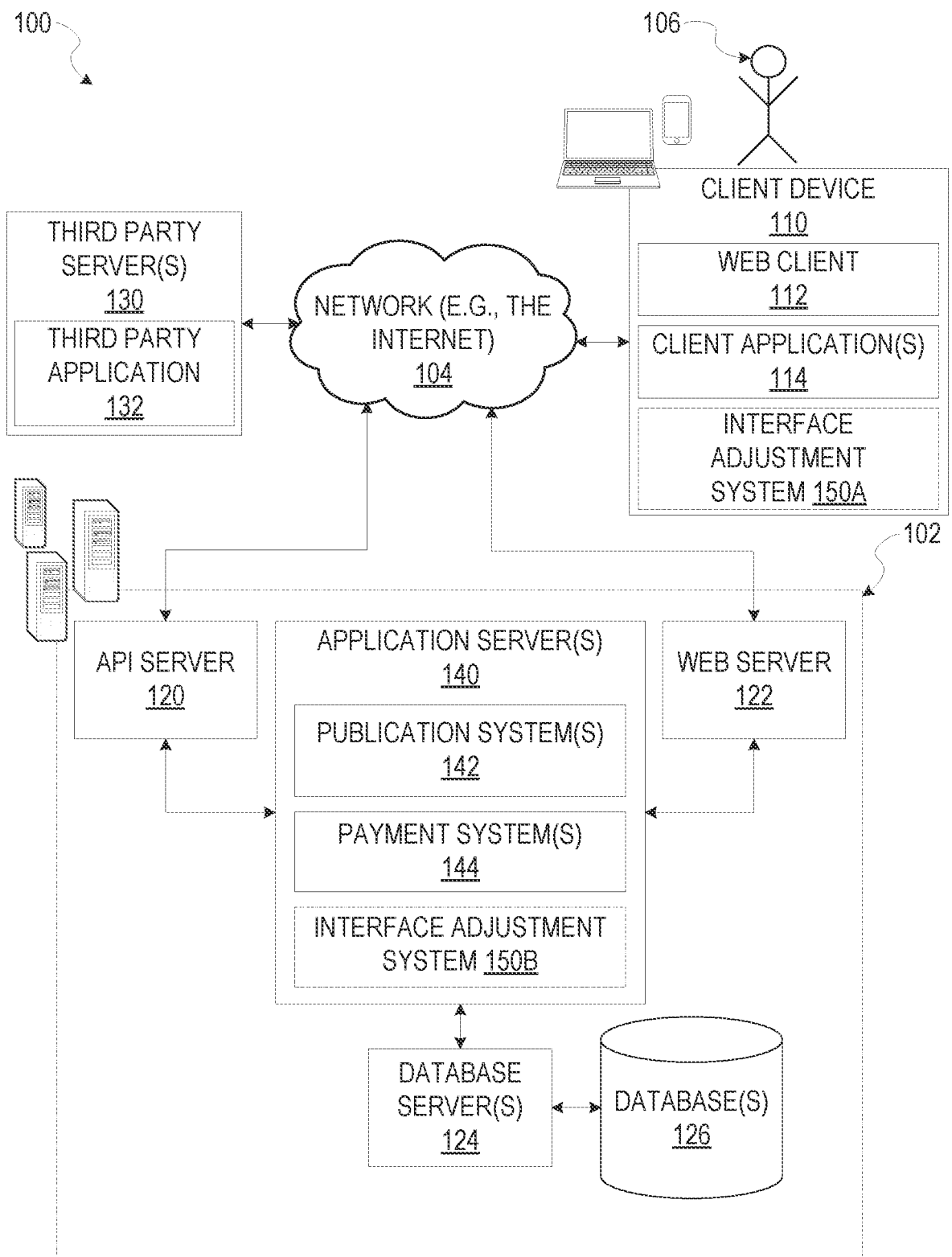
FIG. 1 is a block diagram illustrating a system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In one example embodiment, an interface adjustment system receives user events based on a user interacting with the system. In certain examples, the user events are input received by the system. Examples include, but are not limited to, selecting a button, checking a checkbox, selecting a link, manipulating any other graphical user interface element, or other, or the like. As one skilled in the art may appreciate, there are a wide variety of different ways in which a user may interface with the system, and this disclosure is not limited regarding how the user events are received.

In another example embodiment, the interface adjustment system determines a cognitive mode for the user according to user events. The cognitive mode may be according to a schedule of user events, a sequence of user events, a set of user event types in a period of time, or other arrangements of user events as will be further described.

The cognitive modes may be according to a dual mode of cognitive processing that includes a heuristic mode of cognitive processing and a systematic mode of cognitive processing.

Users interacting with a computing device typically process input according to two distinct cognitive operating modes. A first cognitive operating mode may be described as a heuristic cognitive operating mode. In this mode, a user processes input according to learned procedures and stored memory. The heuristic cognitive operating mode requires less cognitive effort on the part of the user as one skilled in the art may appreciate. This allows the user to make decisions and/or judgments based on displayed information without carefully reviewing the displayed information. Although operating in a heuristic cognitive mode may increase the user's speed, operating in a heuristic cognitive mode may also result in the user engaging the transactions, commitments, and/or other obligations with the computing device without full knowledge of the consequences. Therefore, a system that can detect a user operating in a heuristic cognitive mode and is configured to shift the user from the heuristic cognitive mode to a systematic cognitive mode will help ensure that the user has reviewed relevant information before engaging in a transaction, commitment, and/or obligation with the computing device.

A user operating in a systematic cognitive processing mode typically engages in a thorough review of presented information. In a systematic cognitive operating mode, a user will review more information than a user operating in a heuristic cognitive operating mode. Although this typically takes more time, a benefit is that the user is more likely informed regarding the consequences of engaging in a commitment with a computing device. However, one drawback of the user operating in a systematic cognitive operating mode is that the user may spend inordinate amounts of time reviewing unnecessary and/or irrelevant information. This may result in a decreased likelihood that the user engages in a transaction with the system. Therefore, a system that is configured to determine that a user is operating in a systematic cognitive operating mode, and is capable of shifting the user from a systematic cognitive operating mode to a heuristic cognitive operating mode, may more successfully encourage the user to engage in a transaction using the system.

In one example embodiment, the interface adjustment system alters a user interface element to shift the user from one of the cognitive modes to the other of the cognitive modes.

In one example, the interface adjustment system determines that the user is operating in a heuristic cognitive operating mode because the user has not reviewed relevant information before committing to one or more obligations. For example, perhaps the user has not reviewed purchased related information prior to purchasing a product using the interface adjustment system. In this example, the interface adjustment system may accentuate purchase related information just prior to the user committing to purchase the product. The interface adjustment system may highlight reviews, ratings, shipping conditions, purchase price, or any other relevant information that the user has not reviewed. In this way, the interface adjustment system helps dissuade users from engaging in commitments and/or obligations without having reviewed relevant information related to the commitment and/or obligation.

In one example embodiment, the interface adjustment system determines partial cognitive modes. In one example, the interface adjustment system determines that a user satisfies 80% of behavioral expectations for a heuristic cognitive operating mode and the interface adjustment system adjusts an interface at an 80% level. For example, as the interface adjustment system determines a user's level of a cognitive operating mode, the interface adjustment system adjusts the user interface accordingly.

In one example, the user interface adjustment is font size and a maximum font size is 40. In this example, as the user satisfies 50% of the expectations for a heuristic cognitive operating mode, the interface adjustment system adjusts the user interface 50% of the maximum font size of 40 (e.g., 20). In this example, as the user satisfies 90% of the expectations for a heuristic cognitive operating mode, the interface adjustment system adjusts the font size of relevant information to 90% of the maximum font size (e.g., 36). In this way, the interface adjustment system gradually adjusts a user interface according to a determination that the user is partially operating in a cognitive operating mode.

In another example embodiment, the user events include viewing each comment in a list of comments. For example, a user appears to be reviewing every comment for an item. In response, the interface adjustment system may determine that the user is operating in a systematic cognitive mode and may obfuscate some review comments to limit the user's ability to review comments. This may cause the user to cease operating in the systematic cognitive mode. In this example, the user will more likely purchase the item or move to other potential purchases without persisting in a systematic cognitive mode. In one example embodiment, the interface adjustment system increases a number of search results in response to a user operating in a systematic cognitive mode. This may overwhelm the user and cause the user to cease operating in the systematic cognitive operating mode.

In one example embodiment, the interface adjustment system learns user behavior. For example, in response to determining that a certain user is operating in a heuristic cognitive operating mode, the interface adjustment system may store the sequence of user events used to determine the mode. In response to the user repeating the user events in a subsequent session, the interface adjustment system more quickly determines the cognitive operating mode using learned behavior of the user. Of course, one skilled in the art may appreciate many ways in which the interface adjustment system may learn user behavior and this disclosure includes all such ways.

In another example embodiment, the interface adjustment system determines that the user is operating in a heuristic cognitive operating mode and recommends a course of action that the user may not be aware because the user is operating in a heuristic cognitive mode. In one example, the user desires to purchase an item and has not reviewed the reviews for the item. In response to the item having very poor reviews (e.g. having an average rating of less than two out of five stars), the interface adjustment system recommends a similar product with better reviews. In another example, a seller may have very poor reviews (e.g., less than 90% satisfaction rating). In response to the user not reviewing seller ratings, the interface adjustment system may recommend a different seller for the item. Such recommendations increase a likelihood that the transaction between the user and the system will be successful.

With reference to FIG. 1, an example embodiment of a high-level client-server-based network architecture 100 is shown. A network system 102, in the example forms of a network-based marketplace or payment system, provides server-side functionality via a network 104 (e.g., the Internet or wide area network (WAN)) to one or more client devices

110. FIG. 1 illustrates, for example, a web client 112 (e.g., a browser, such as the Internet Explorer® browser developed by Microsoft® Corporation of Redmond, Wash. State), client application(s) 114, and a interface adjustment system 150A as will be further described, executing on the client device 110. In another example embodiment, the interface adjustment system 150B is implemented as part of the network system 102.

The client device 110 may comprise, but is not limited to, a mobile phone, desktop computer, laptop, personal digital assistant (PDA), smart phone, tablet, ultra book, netbook, laptop, multi-processor system, microprocessor-based or programmable consumer electronics, game console, set-top box, or any other communication device that a user may utilize to access the network system 102. In some embodiments, the client device 110 may comprise a display module (not shown) to display information (e.g., in the form of user interfaces). In further embodiments, the client device 110 may comprise one or more of a touch screen, accelerometer, gyroscope, camera, microphone, global positioning system (GPS) device, and so forth. The client device 110 may be a device of a user that is used to perform a transaction involving digital items within the network system 102. In one embodiment, the network system 102 is a network-based marketplace that responds to requests for product listings, publishes publications comprising item listings of products available on the network-based marketplace, and manages payments for these marketplace transactions.

In certain embodiments, the interface adjustment system 150 (e.g., 150A or 150B) determines the cognitive operating mode of a user 106 based, at least in part, on the user's 106 interactions with the network system 102. As indicated in FIG. 1, the interface adjustment system 150 is implemented as part of a client device 110. In this embodiment, the interface adjustment system 150A receives input from the user that includes the user events and transmits the events to the network system 102. In this example embodiment, the interface adjustment system 150A modifies one or more user interface elements according to the cognitive operating mode of the user. The network system 102 may transmit search results to the client device 110, and the interface adjustment system 150A interrupts the transmission and alters one or more user interface elements.

In one example, the network system 102 generates hypertext markup language (HTML) for the user 106. The network system 102 transmits the HTML to the client device 110, and the interface adjustment system 150 alters one or more portions of the HTML according to the cognitive operating mode of the user as described herein.

In another example embodiment, an interface adjustment system 150 operates as part of the network system 102 and receives the user events from the client device 110. In this example embodiment, the interface adjustment system 150 affects the generation of the HTML code to alter one or more user interface elements.

One or more users 106 may be a person, a machine, or other means of interacting with the client device 110. In embodiments, the user 106 is not part of the network architecture 100, but may interact with the network architecture 100 via the client device 110 or another means. For example, one or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given client device 110, then this application is configured to locally provide the user interface and at least some of the functionalities with the application configured to communicate with the network system 102, on an as needed basis, for data and/or processing capabilities not locally available (e.g., access to a database of items available for sale, to authenticate a user, to verify a method of payment, etc.). Conversely, if the e-commerce site application is not included in the client device 110, the client device 110 may use its web browser to access the e-commerce site (or a variant thereof) hosted on the network system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is then communicated to the network system 102 via the network 104. In this instance, the network system 102, in response to receiving the input from the user 106, communicates information to the client device 110 via the network 104 to be presented to the user 106. In this way, the user 106 can interact with the network system 102 using the client device 110.

An application program interface (API) server 120 and a web server 122 are coupled to, and provide programmatic and web interfaces respectively to, one or more application server(s) 140. The application server(s) 140 may host one or more publication systems 142 and payment systems 144, each of which may comprise one or more modules or applications and each of which may be embodied as hardware, software, firmware, or any combination thereof. The application server(s) 140 are, in turn, shown to be coupled to one or more database servers 124 that facilitate access to one or more information storage repositories or database(s) 126. In an example embodiment, the database(s) 126 are storage devices that store information to be posted (e.g., publications or listings) to the publication system(s) 142. The database(s) 126 may also store digital item information in accordance with example embodiments.

Additionally, a third party application 132, executing on third party server(s) 130, is shown as having programmatic access to the network system 102 via the programmatic interface provided by the API server 120. For example, the third party application 132, utilizing information retrieved from the network system 102, supports one or more features or functions on a website hosted by the third party. The third party website, for example, provides one or more promotional, marketplace, or payment functions that are supported by the relevant applications of the network system 102.

The publication system(s) 142 may provide a number of publication functions and services to users 106 that access the network system 102. The payment system(s) 144 may likewise provide a number of functions to perform or facilitate payments and transactions. While the publication system(s) 142 and payment system(s) 144 are shown in FIG. 1 to both form part of the network system 102, it will be appreciated that, in alternative embodiments, each system 142 and 144 may form part of a payment service that is separate and distinct from the network system 102. In some embodiments, the payment system(s) 144 may form part of the publication system(s) 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system(s) 142, payment system(s) 144, and interface adjustment system 150 could also be implemented as standalone software programs, which do not necessarily have networking capabilities.

The web client 112 may access the various publication and payment systems 142 and 144 via the web interface supported by the web server 122. Similarly, the interface adjustment system 150A may communicate with the network system 102 via a programmatic client. The programmatic client accesses the various services and functions provided by the publication and payment systems 142 and 144 via the programmatic interface provided by the API server 120. The programmatic client may, for example, be a seller application (e.g., the Turbo Lister application developed by eBay® Inc., of San Jose, Calif.) to enable sellers to author and manage listings on the network system 102 in an off-line manner, and to perform batch-mode communications between the programmatic client and the network system 102.

Additionally, a third party application(s) 132, executing on a third party server(s) 130, is shown as having programmatic access to the network system 102 via the programmatic interface provided by the API server 120. For example, the third party application 132, utilizing information retrieved from the network system 102, may support one or more features or functions on a website hosted by the third party. The third party website may, for example, provide one or more promotional, marketplace, or payment functions that are supported by the relevant applications of the network system 102.

Figure 2:
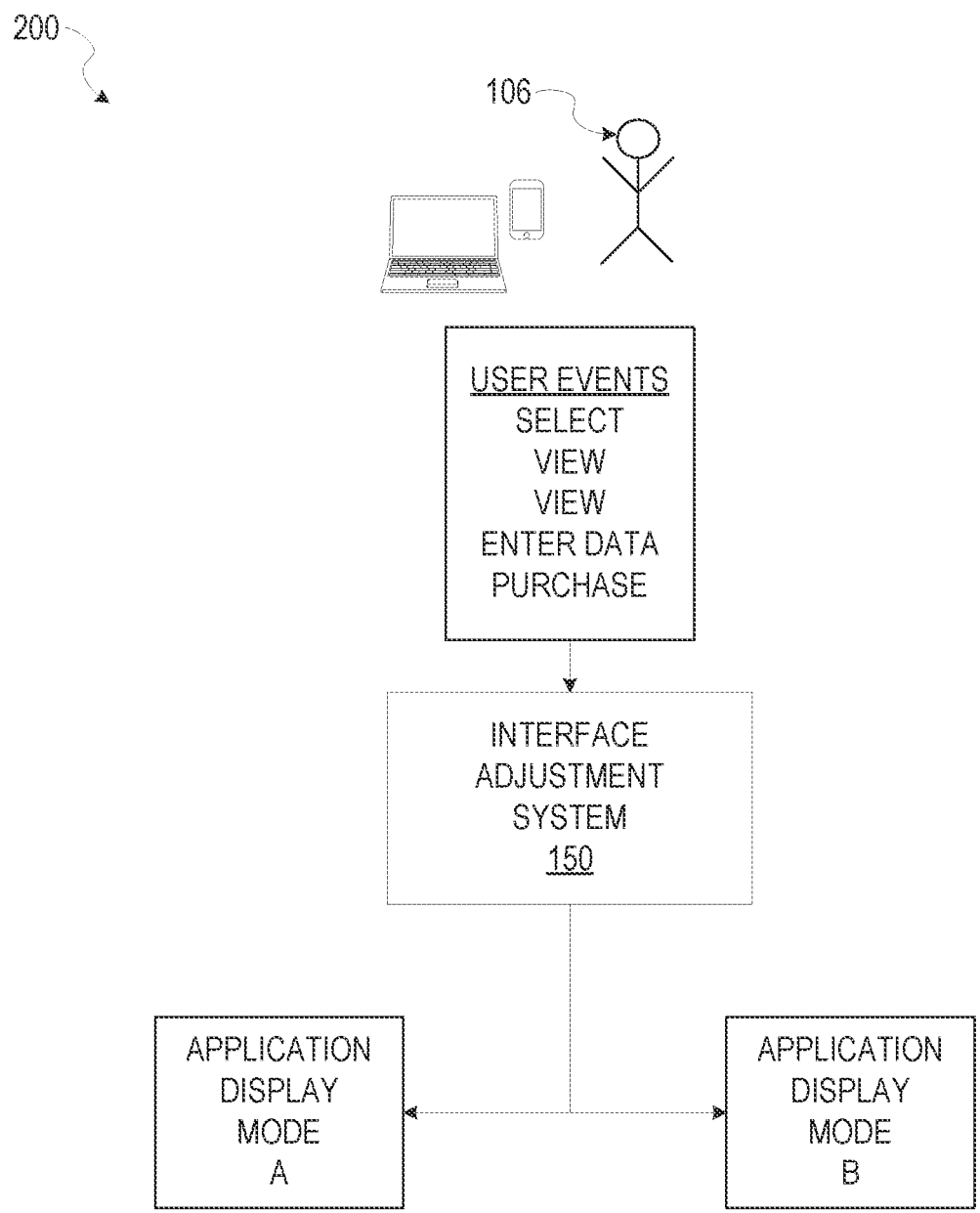
FIG. 2 is a data flow diagram, according to one example embodiment of a system for adjusting an interface based on a cognitive mode.

FIG. 2 is a data flow diagram, according to one example embodiment 200, of a system for adjusting an interface based on a cognitive mode. In this example embodiment, the user 106 initiates several user events while interacting with the interface adjustment system 150. For example, the user 106 selects items, views items, submits search queries, responds to inquiries, sets settings, enters data, purchases items, or causes any other user event as one skilled in the art may appreciate.

In one example embodiment, the interface adjustment system 150 determines a cognitive operating mode based on the user events and determines an application display mode according to the determined cognitive operating mode of the user. For example, in response to the interface adjustment system 150 determining that the user 106 is operating in a heuristic cognitive operating mode, the interface adjustment system 150 indicates application display mode A. In response to the interface adjustment system 150 determining that the user is operating in the systematic cognitive operating mode, the interface adjustment system 150 indicates application display mode B. Of course, there may be other cognitive operating modes and other application display modes, and this disclosure is meant to include all such modes.

Figure 3:
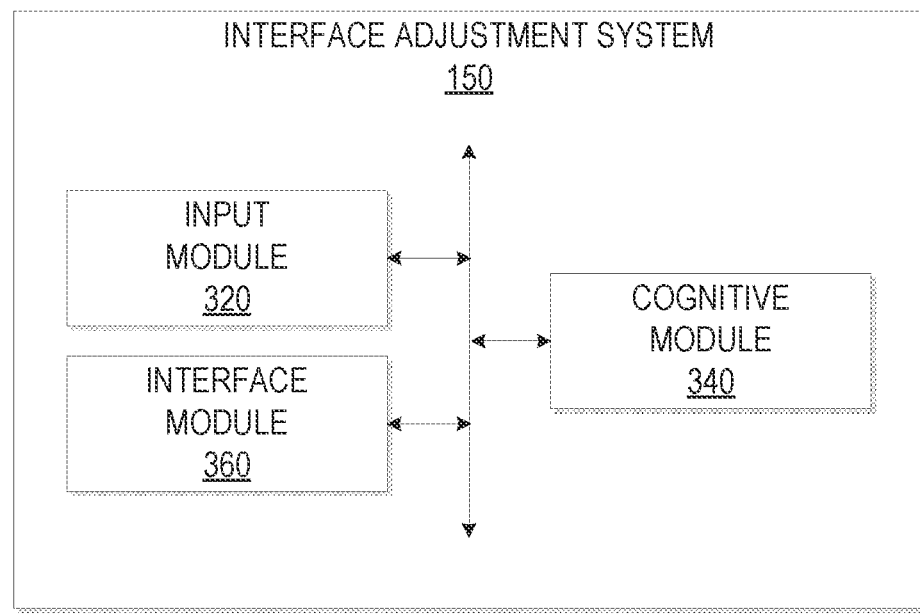
FIG. 3 is a block diagram illustrating one example embodiment of a system for adjusting an interface based on a cognitive mode.

FIG. 3 is a block diagram illustrating one example embodiment of a system 300 for adjusting an interface based on a cognitive mode. In one example embodiment, the system 300 includes an input module 320, a cognitive module 340, and an interface module 360.

In one example embodiment, the input module 320 is configured to receive user events based on a user interacting with the system. The input module 320 may receive user selections, user views, user indications, user input, purchases, or any other events initiated by a user 106. In certain examples, the user 106 manipulates a user interface element at a graphical user interface causing executable code associated with the elements to instigate an event. Of course, one skilled in the art may recognize other ways in which a user may cause user events and this disclosure is not limited in this regard.

In another example embodiment, the cognitive module 340 is configured to determine which cognitive operating mode the user is operating in based on the user events. The cognitive operating mode may be according to a dual mode of cognitive processing as previously described.

In one example embodiment, the cognitive module 340 determines that the user is operating in a heuristic cognitive mode based, at least in part, on the user not reviewing relevant information. In one example, a user event includes the user 106 purchasing an item. In response to the user not reviewing information relevant to the purchase, the cognitive module 340 determines that the user is operating in a heuristic cognitive mode.

In another example embodiment, the cognitive module 340 determines that the user is operating according to a scale of a cognitive operating mode. For example, the cognitive module 340 may determine that the user is operating according to 60% of the heuristic cognitive operating mode. In another example embodiment, the cognitive module 340 determines that the user is operating in 70% systematic cognitive operating mode and 30% heuristic cognitive operating mode. In response, the cognitive module 340 determines that the user is operating in a systematic cognitive operating mode because the percentage is above 50%.

In another example embodiment, the cognitive module 340 determines that the user is operating in a heuristic cognitive mode based, at least in part, on the user initiating below a threshold number of user events prior to engaging in a commitment and/or obligation with the system 150. In one example, the threshold number of user events is three. In this example, in response to the user 106 initiating less than three user events prior to accepting an obligation with the system 150, the cognitive module 340 determines that the user is operating in a heuristic cognitive mode.

In another example embodiment the cognitive module 340 determines that the user 106 is operating in a heuristic cognitive mode based, at least in part, on the user 106 initiating more than a threshold number of user events per unit time. In one example, the threshold number of user events per unit time is one user event per second. In response to the user 106 initiating a series of user events at more than one user event per second, the cognitive module 340 determines that the user is operating in a heuristic cognitive mode. For example, the user 106 may proceed through a set of user screens with a next button for each screen. Each screen may contain sufficient information such that a user 106 reading at an average speed would take 10 or more seconds to read each screen. They user 106 taking less than one second for each screen likely indicates that the user 106 is not reviewing the relevant information. Therefore, the cognitive module 340 determines that the user 106 is operating in a heuristic cognitive mode.

In one example embodiment, the cognitive module 340 determines that the user 106 is operating in a heuristic cognitive mode based, at least in part, on the user initiating user events consistent with a predetermined pattern of user events. In one example, a user 106 may desire to purchase an item at the network system 102. In this example a predetermined sequence of user events includes an initial query event, a selection event, and a purchase event. In response to the user initiating these three events without initiating other events, the cognitive module 340 determines that the user 106 is operating in a heuristic cognitive mode because the user initiated events in a sequence consistent with a predetermined pattern.

In another example embodiment, the cognitive module 340 stores a most recent cognitive operating mode for a user based on recent interactions with the user. In response to the user interacting with the system 150 then disconnecting, the cognitive module 340 may store the most recent determined cognitive operating mode for the user. In response to the user reconnecting to the system 150, the cognitive operating module may immediately determine that the user's cognitive operating module is the most recent cognitive operating mode for the user.

In one example, the cognitive module 340 determines that a user's cognitive operating mode is systematic. In response to the user interacting with the system 150 at a later time, the cognitive module 340 may assume that the user's cognitive operating mode is systematic before receiving any events from the user. In this way, the interface module 360 may alter the user's interface according to a likely cognitive operating mode before receiving user event for a current period of time.

In another example embodiment, a user authenticates with the system 150 and the cognitive module 340 determines that the user's cognitive operating mode is heuristic. In this example, the user may switch to a different device and authenticate with the system 150. In response, the cognitive module 340 may initially assume that the user is still operating in the heuristic cognitive operating mode and the interface module 360 may alter one or more user interface elements accordingly.

In another example embodiment, the cognitive module 360 includes a time of day in determining a cognitive operating mode for the user. For example, the cognitive module 340 may lower a threshold number of events based on the user interacting with the system 150 after 11 PM. In another example, the cognitive module 340 may increase a threshold time period between user events based on the user interacting with the system 150 during a lunch period (e.g. 12 PM to 1 PM) where the user is more likely operating in a heuristic cognitive operating mode.

In one example embodiment, the cognitive module 360 includes a duration in determining the cognitive operating mode for the user. For example, the cognitive module 340 may lower a threshold number of events per unit time in response to a session with the user exceeding 10 hours.

In another example embodiment, the cognitive module 360 includes a type of device the user is using to interact with the system 150. For example, in response to the user interacting with the system 150 using a smart phone, tablet, or other hand-held device, the cognitive module may more quickly determine that the user is operating in a heuristic cognitive operating mode. The cognitive module 340 may do this by lower a threshold value for conditions that indicate the cognitive operating mode. In another example, a user interacts with the system 150 using a desktop computer. In response, the cognitive module 340 may lower a threshold time period between event. In this way, the cognitive module 340 more quickly determines that the user is operating in a systematic cognitive operating mode based, at least in part, on the type of the device the user is using to interact with the system 150. Of course, the user may operate in any cognitive operating mode on any device and this disclosure is not limited in this regard.

In one example embodiment, the interface module 360 is configured to altering one or more user interface elements to shift the user from the determined cognitive operating mode to a different cognitive operating mode. In one example, the interface module 360 alters a user interface element to shift the user from a heuristic cognitive operating mode to a systematic cognitive operating mode. In another example, the interface module 360 alters a user interface element to shift the user from a systematic cognitive operating mode to a heuristic cognitive operating mode.

One example embodiment, the cognitive module 340 determines that the user is operating in a systematic cognitive operating mode based on the user reviewing each item in the list of items returned in response to a query received from the user. In this example embodiment, interface module 360 increases a number of search results based on his subsequent query. Increasing the number of search results in this way may overwhelm the user. In response to being overwhelmed with search results, the user 106 may stop reviewing each search result, which results in a user shifting from a systematic cognitive operating mode to a heuristic cognitive operating mode.

In another example embodiment, in response to the cognitive module 340 determining that the user 106 is operating in a heuristic cognitive operating mode, the interface module 360 displays the recommended course of action to the user 106. Because the user 106 is operating in a heuristic cognitive mode, the user 106 may have missed relevant information.

In one example embodiment, in response to the user 106 operating in a heuristic cognitive operating mode and requesting to engage in a transaction with a seller having poor ratings, the interface module 360 recommends a different seller for the user 106. For example, when more than one seller offers an item for sale at the network system 102, and the user (operating in a heuristic cognitive operating mode) is requesting to engaging in a transaction with the user having ratings below a 90% buyer's satisfaction rating, the interface module 360 recommends to the user 106 to purchase the item from a seller having a higher buyer satisfaction rating. In one example, the interface module 360 recommends the seller with the highest buyer satisfaction rating, but of course, this is not necessarily the case.

In another example embodiment, in response to the user 106 operating in a heuristic cognitive operating mode having not reviewed item ratings and requesting to purchase the item, the interface module 360 recommends to the user 106 to purchase a different item. In another example, the interface module 360 summarizes the item's poor ratings to the user before the user 106 purchases the item. In another example, the interface module 360 emphasizes the item's poor ratings to the user 106 before the user 106 purchases the item. Such recommendations by the interface module 360 decrease the likelihood that the user 106 will engage in a transaction, commitment, and/or obligation using the system 150 that may result in the user 106 being dissatisfied.

In one example embodiment, the interface module adjusts the user interface in a similar scale as compared with the user operating in a partial cognitive operating mode. For example, in response to the user operating in a 65% heuristic cognitive operating mode, the interface module 360 adjusts the user interface 65%.

For example, where the interface module 360 moves relevant information to the top of a page in response to the user operating in 100% heuristic mode, the interface module 360 moves the relevant information 80% towards the top of the page in response to the cognitive module 340 determining that the user is operating according to 80% of the heuristic cognitive operating mode. Therefore, according to a gradual scale of locations, the interface module 360 gradually adjusts one or more user interface elements based, at least in part, on the portion of the cognitive operating mode of the user.

In another example embodiment, the cognitive module 340 determines that the user 106 is operating in a systematic cognitive operating mode in response to the user 106 performing an exhaustive review of relevant information. In response, the interface module 360 summarizes a portion of the relevant information. Because the user 106 no longer has access to the detailed information, the user shifts from a systematic cognitive operating mode to a heuristic cognitive operating mode. This increases the likelihood that the user 106 will engage in a transaction using the system 150.

In another example embodiment, the cognitive module 340 determines that the user 106 is operating in a heuristic cognitive operating mode based on the user 106 not selecting a property of a purchased item. For example, where a purchased item requires the user 106 to select size or color or other property of the item, in response to the user not selecting the property, the cognitive module 340 determines that the user is operating in a heuristic cognitive operating mode. In response to the user requesting to purchase the item while having not indicated the required property of the item, the interface module 360 may again request that the user indicate the required property. For example, if a seller of an item requires that the user indicate a color of the item, the interface module 360 may again request that the user indicate the color of the item before purchasing. In this way the interface module 360 ensures that information needed for a complete transaction is received by the user 106. Therefore, in certain embodiments, the interface module 360 presents a message to the user 106 in response to the user not reviewing relevant information before engaging in transaction, commitment, and/or obligation using the system 150.

In other embodiments, the interface module 360 summarizes relevant information that was not reviewed by the user. In another example embodiment, the interface module 360 accentuates relevant information that was not reviewed by the user. In certain examples, accentuating relevant information may include highlighting, bolding, increasing a font size, or modifying any other property of the relevant information to increase the likelihood that the user 106 recognizes the relevant information before engaging in a transaction, commitment, and/or obligation using the system 150.

In another example embodiment, the interface module 360 changes the location of the user interface element in response to the cognitive module 340 determining that the user is operating in a heuristic cognitive operating mode. As will be further described in subsequent examples, changing the location of the user interface element may motivate a user to shift from a heuristic cognitive operating mode to a systematic cognitive operating mode.

In a specific example embodiment, the interface module 360, in response to a number of reviews for a product being below the threshold number, may display the number of reviews next to the average review rating for the product. In this way, the user 106 may be less likely to believe that the product has good reviews based on too small of a sample size.

In another example embodiment, the interface module 360 hides information from the user 106. For example, in response to the user 106 operating a systematic cognitive operating mode, the interface module 360 may move information into a tabular user interface control. Thus, because the information is hidden from the view of the user 106, the user 106 will less likely review the hidden information. This may shift the user from a systematic cognitive operating mode to a heuristic cognitive operating.

In one example embodiment, interface module 360 hides information that is not specifically relevant to the purchase of a product. In this way, relevant information is available to the user 106 while the irrelevant information is hidden from view. By reducing the amount of information presented to the user 106, the user 106 spends less time reviewing relevant information, and may more quickly engage in a transaction using the network system 102.

In one specific example, a particular product may have excellent reviews. Because the product has excellent reviews, the system 150 does not need to protect the user from the product. Hiding the reviews may increase the likelihood the user purchases the product because a user operating in a systematic mode may not get stuck reviewing large amounts of reviews. Because the reviews are hidden from the user 106, the user 106 transitions from a systematic cognitive operating mode to a heuristic cognitive operating mode and may purchase the product quickly.

In another example embodiment, the interface module 360 summarizes relevant information that the user 106 has not reviewed. For example where the user has not reviewed the ratings for a product before purchasing the product using the network system 102, the interface module 360 may provide a summary of the ratings. In one example, if the ratings are above a threshold number, the interface module 360 may simply provide a single comment that indicates an average rating. For example the interface module 360, may present a message that indicates that the rating for the product is "very good."

However, if a product has very poor reviews and the user 106 does not review the poor reviews, in order to protect the user 106 from a potentially bad experience (e.g. purchasing a poor product), the interface module 360 may summarize the poor reviews to the user 106 before the user 106 purchases the product. This may help protect the user 106 from purchasing products with poor reviews. In in one example, poor reviews include a product having an average review rating of two or less stars out of five stars. In another example, a poor rating includes a buyer satisfaction level of less than 80%. Of course, one skilled in the art may appreciate other ways to determine whether a product has poor reviews and this disclosure is meant to include all such ways.

In another example embodiment, the interface module 360 further modifies a user interface element based on the value of the transaction engaged in by a user 106 using the system 150. In an example where the user is purchasing a toothbrush, the interface module 360 is less concerned about protecting the user from the potential unsatisfactory transaction. In another example, the user 106 is purchasing jewelry and the interface module 360 more aggressively summarizes relevant information that the user 106 has not reviewed before purchasing the jewelry. For example, in response to the product costing more than a threshold number of dollars, the interface module 360 modifies the user interface element.

In one example embodiment, the interface module 360 considers an aspect of the seller of the product in determining whether to modify a user interface element as described herein. In one example, a certain seller has contributed more funds to charity than other sellers. In response to the user viewing an item for sale by the seller, the interface module 360 adds the amount that the seller has contributed to charity to the display. Because the display is now different than before, the user may shift from a heuristic cognitive operating mode to a systematic cognitive operating mode. Operating in a systematic cognitive operating mode increases the likelihood that the user 106 views the added information. In this way, the interface adjustment system 150 increases likelihood that the user will purchase the product because the user 106 perceives the seller as a better alternative than other sellers.

In another example embodiment, the cognitive module 340 determines that a user 106 is operating in a heuristic cognitive operating mode and the interface module 360 determines that the user is purchasing a product from a seller that is not within a threshold distance from the user 106. In response to identifying another seller of the same product that is within a threshold distance from the user 106, the interface module 360 alters a graphical user interface element to recommend to the user 106 that another seller offers the same product but is much closer. The interface module 360 may also indicate that the shipping time between the closer seller and the user 106 will likely be less than the shipping time from the non-local seller.

In other examples, the interface module 360 recommends other sellers to a user 106 operating in a heuristic cognitive operating mode as described herein by modifying a user interface and/or one or more elements of a graphical user interface. Example scenarios include recommending other sellers based, at least in part, on price, a number of transactions, a membership length, an average rating, shipping speed, shipping costs, local reviews, local opinions, other credibility cues, or any other property of a seller as one skilled in the art may appreciate.

Figure 4:
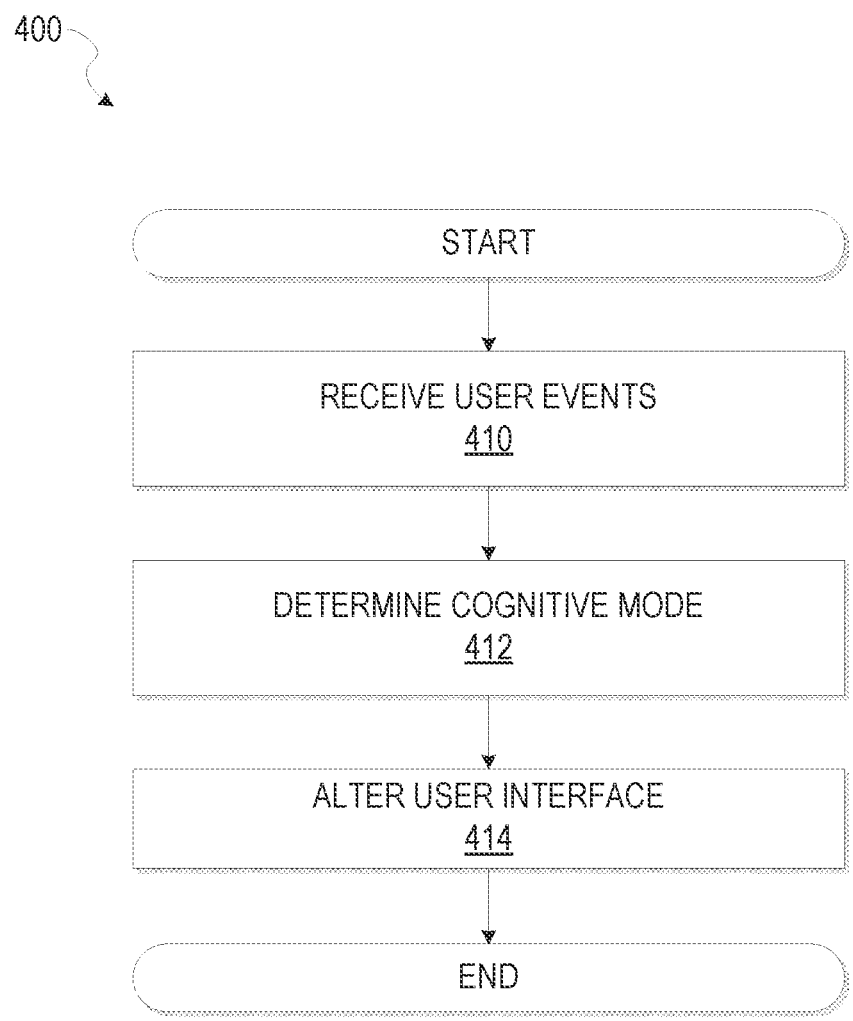
FIG. 4 is a flow chart diagram illustrating another method for adjusting an interface based on a cognitive mode.

FIG. 4 is a flow chart diagram illustrating a method 400 for adjusting an interface based on a cognitive mode, according to one example embodiment. Operations in the method 400 may be performed by the system 150, using modules described above with respect to FIG. 3. As shown in FIG. 4, the method 400 includes operations 410, 412, and 414.

In one example embodiment, the method 400 begins at operation 410 and the input module 320 receives a plurality of user events based on a user interacting with the system 150. In one example, the user event is a request to view a product available for purchase at the network system 102. In this example, the user operates one or more user interface elements at a remote computing device causing transmission of the request from the system 150.

The method 400 continues at operation 412 and the cognitive module 340 determines a cognitive operating mode of the user based on the user events as described herein. In one example, the user 106 initiates less than a threshold number of events before engaging in a transaction with the system 150, and the cognitive module 340 determines that the user 106 is operating in a heuristic cognitive operating mode.

The method 400 continues at operation 414 and the interface module 360 modifies a property of a user interface element according to the cognitive operating mode of the user. For example, the interface module 360 increases a font size for relevant information that the user has not reviewed.

Figure 5:
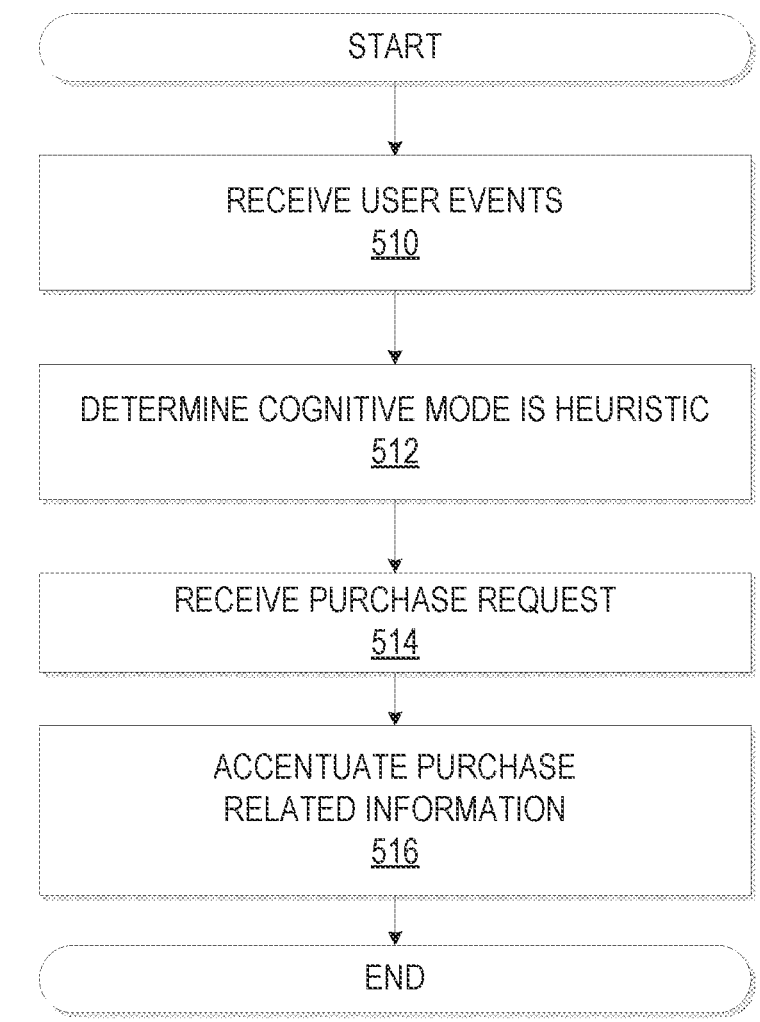
FIG. 5 is a flow chart diagram illustrating another method for adjusting an interface based on a cognitive mode.

FIG. 5 is a flow chart diagram illustrating another method for adjusting an interface based on a cognitive mode. Operations in the method 500 may be performed by the system 150, using modules described above with respect to FIG. 3. As shown in FIG. 5, the method 500 includes operations 510, 512, 514, and 516.

In one example embodiment, the method 500 begins at operation 510 and the input module 320 receives a plurality of user events based on a user interacting with the system 150. In one example, the user event includes an event in response to the user 106 selecting a button at a user interface.

The method 500 continues at operation 512 and the cognitive module 340 determines a cognitive operating mode of the user based on the user events as described herein. In one example, the cognitive module 340 determines that the user is operating in a heuristic cognitive operating mode in response to the user 106 selecting buttons at a rate that is faster than a threshold event rate.

The method 500 continues at operation 514 and the input module 320 receives a purchase request from the user 106. In response to an imminent purchase (based on the received purchase request) and the user 106 operating in a heuristic cognitive operating mode, the interface module 360, at operation 516, accentuates purchase related information. In one example, the purchase related information was not reviewed by the user. This helps ensure that the user is aware of purchase related information before purchasing.

Figure 6:
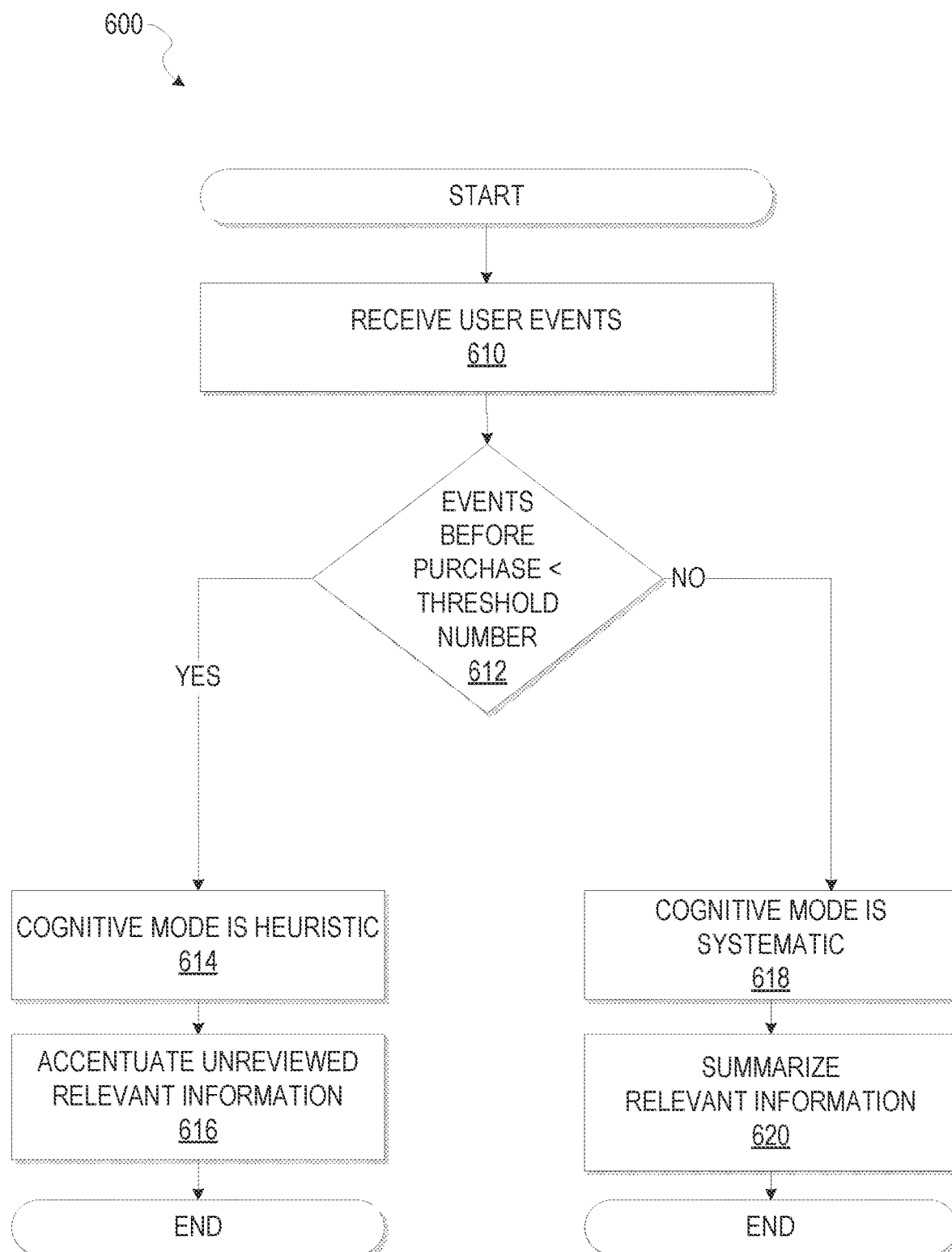
FIG. 6 is a flow chart diagram illustrating one example method for adjusting an interface based on a cognitive mode, according to one embodiment.

FIG. 6 is a flow chart diagram illustrating one example method 600 for adjusting an interface based on a cognitive mode, according to one embodiment. Operations in the method 600 may be performed by the system 150, using modules described above with respect to FIG. 3. As shown in FIG. 6, the method 600 includes operations 610, 612, 614, 616, 618, and 620.

In one example embodiment, the method 600 begins at operation 610 and the input module 320 receives a plurality of user events based on a user interacting with the system 150. In one example, the user event is a query submission for available products at the network system 102.

The method 600 continues at operation 612 and the cognitive module 340 determines whether a number of events submitted by the user 106 (before a purchase request event) is below a threshold number. In one example, the threshold number is ten events.

In response to the user initiating less than the threshold number of events, the method 600 continues at operation 614 where the cognitive module 340 determines that the user is operating in a heuristic cognitive operating mode. The method 600 continues at operation 616 and the interface module 360 accentuates unreviewed relevant information as previously described. For example, the interface module 360 changes a font property to bold for relevant information to increase the likelihood that the user views the relevant information.

In response to the user 106 initiating more than the threshold number of events, the method 600 continues at operation 618 and the cognitive module 340 determines that the user 106 is operating in a systematic cognitive operating mode. The method 600 continues at operation 620 and the interface module 360 modifies one or more user interface elements to summarize relevant information. For example, the interface module 360 displays an average rating instead of a list of ratings.

Figure 7:
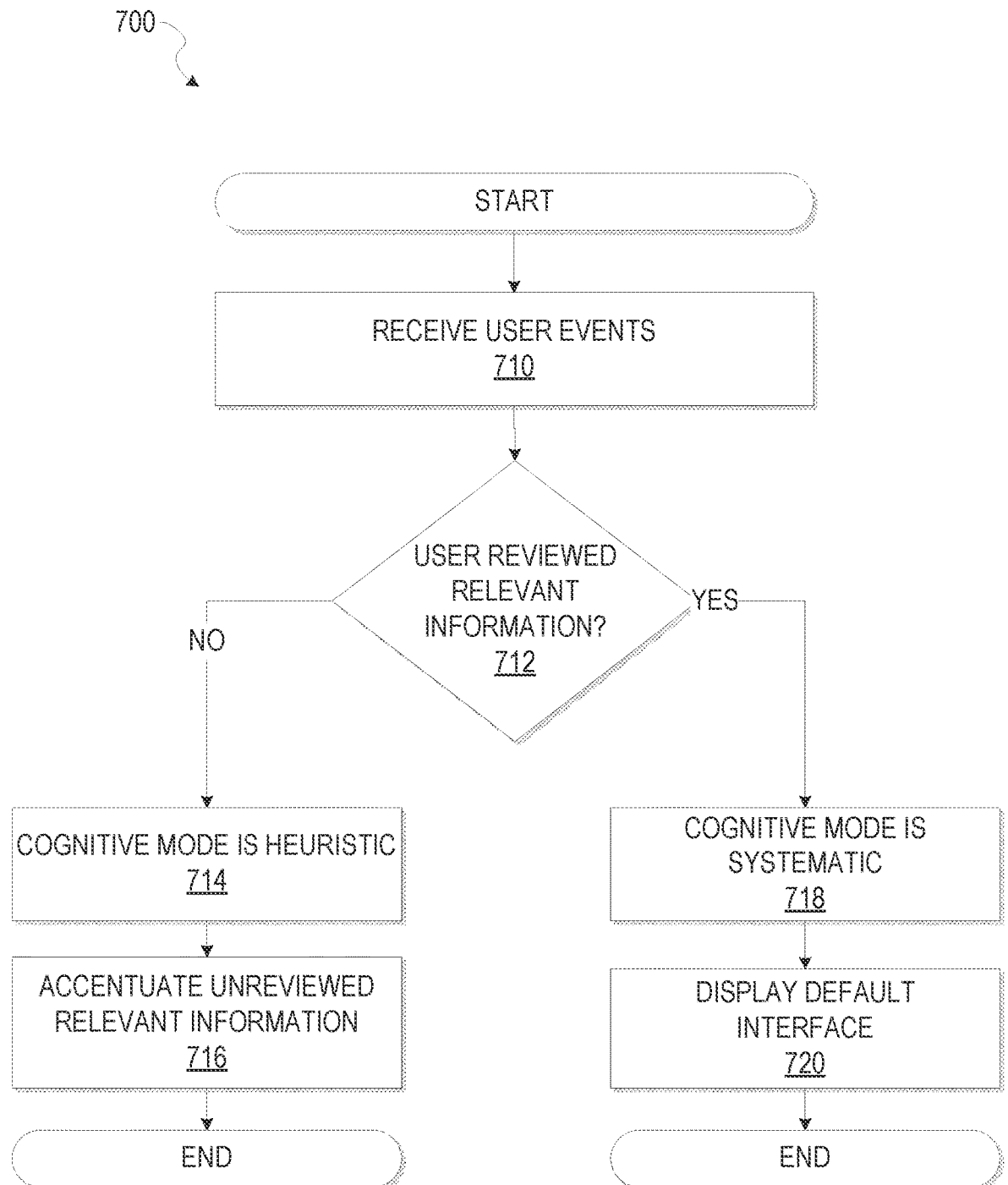
FIG. 7 is a flow chart diagram illustrating a method for adjusting an interface based on a cognitive mode.

FIG. 7 is a flow chart diagram illustrating a method 700 for adjusting an interface based on a cognitive mode. Operations in the method 700 may be performed by the system 150, using modules described above with respect to FIG. 3. As shown in FIG. 7, the method 700 includes operations 710, 712, 714, 716, 718, and 720.

In one example embodiment, the method 700 begins at operation 710 and the input module 320 receives a plurality of user events based on a user interacting with the system 150. In one example, the user event is a request for information from the network system 102.

The method 700 continues at operation 712 and the cognitive module 340 determines whether the user 106 has reviewed relevant information. For example, where an item is being shipping following purchase, the cognitive module 340 determines whether the user 106 has reviewed the shipping conditions for the item.

In response to the user not reviewing the relevant information, the method 700 continues at operation 714 where the cognitive module 340 determines that the user is operating in a heuristic cognitive operating mode. The method 700 continues at operation 716 and the interface module 360 accentuates the information that was not reviewed. For example, the interface module 360 may repeat the display of shipping conditions.

In response to the user 106 reviewing the relevant information, the method 700 continues at operation 718 and the cognitive module 340 determines that the user 106 is operating in a systematic cognitive operating mode. The method 700 continues at operation 720 and the interface module 360 modifies one or more user interface elements to revert to a default display interface. Therefore, according to certain embodiments, the interface module 360 may either accentuate or summarize relevant information based, at least in part, on the cognitive mode of the user 106.

Figure 8:
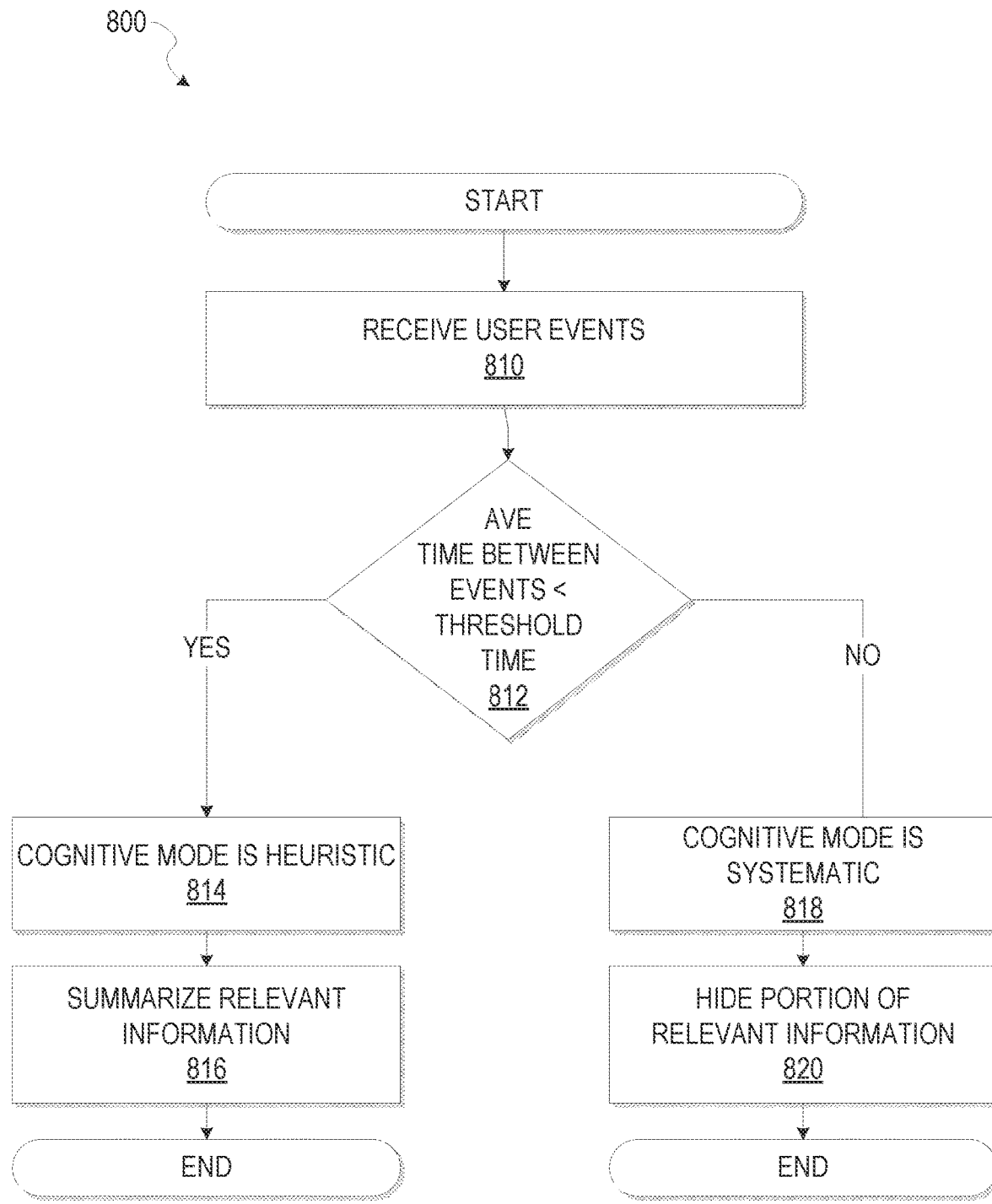
FIG. 8 is a flow chart diagram illustrating another method for adjusting an interface based on a cognitive mode.

FIG. 8 is a flow chart diagram illustrating another method 800 for adjusting an interface based on a cognitive mode. Operations in the method 800 may be performed by the system 150, using modules described above with respect to FIG. 3. As shown in FIG. 8, the method 800 includes operations 810, 812, 814, 816, 818, and 820.

In one example embodiment, the method 800 begins at operation 810 and the input module 320 receives a plurality of user events based on a user interacting with the system 150. In one example, the user events include the user clicking on a link.

The method 800 continues at operation 812 and the cognitive module 340 determines an average time between user events. In response to the average time between user events being below a threshold time, the method 800 continues at operation 814 and the cognitive module 340 determines that the user is operating in a heuristic cognitive operating mode. The method 700 continues at operation 816 and the interface module 360 summarizes relevant information for the user 106.

In response to the user average time between user events exceeding the threshold time, the method 800 continues at operation 818 and the cognitive module 340 determines that the user 106 is operating in a systematic cognitive operating mode. The method 800 continues at operation 820 and the interface module 360 modifies one or more user interface elements to hide a portion of relevant information. For example, the interface module 360 may hide reviews, feedback, comments, or the like.

Figure 9:
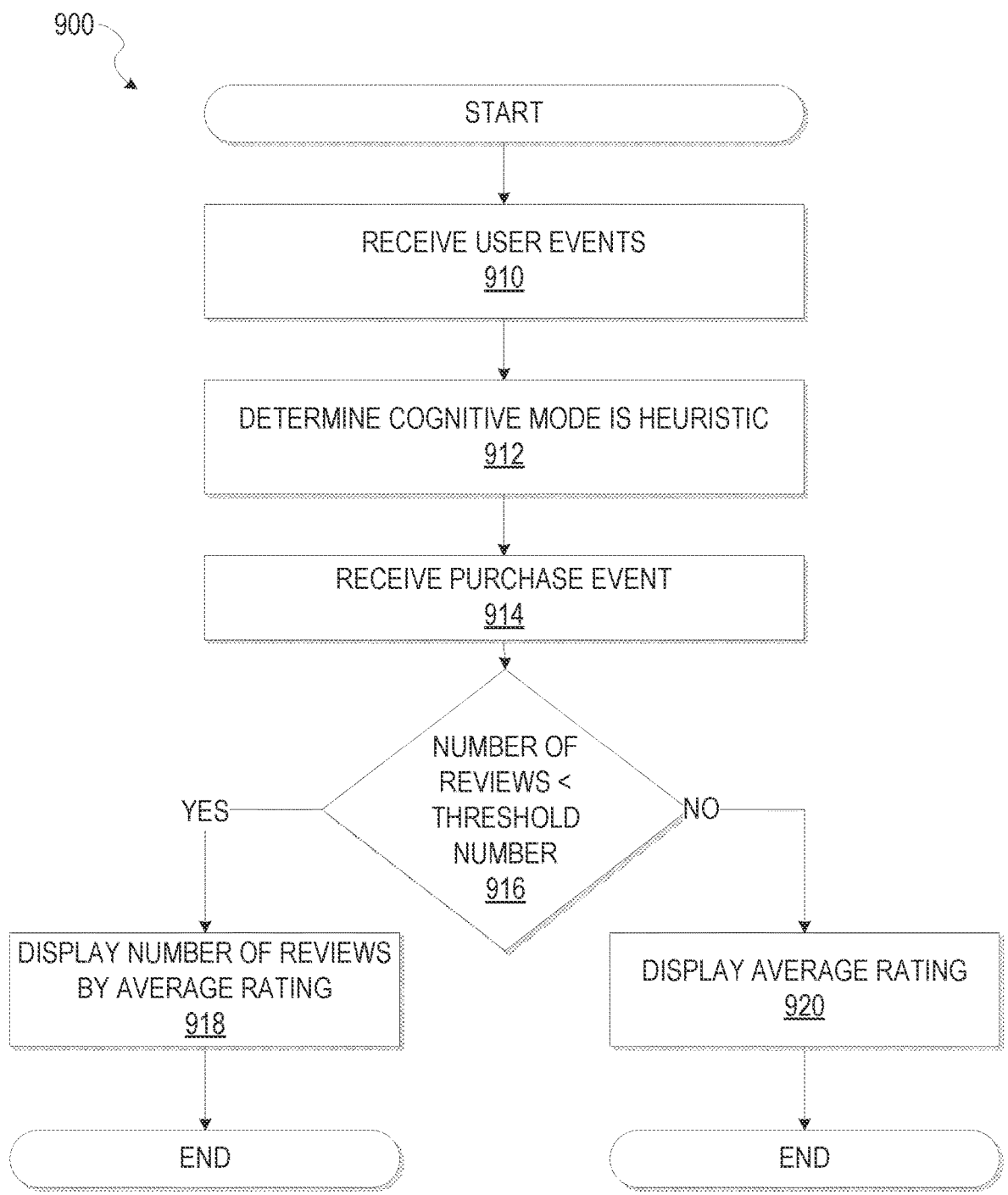
FIG. 9 is a flow chart diagram illustrating a method for adjusting an interface based on a cognitive mode.

FIG. 9 is a flow chart diagram illustrating a method for adjusting an interface based on a cognitive mode. Operations in the method 900 may be performed by the system 150, using modules described above with respect to FIG. 3. As shown in FIG. 9, the method 900 includes operations 910, 912, 914, 916, 98, and 920.

In one example embodiment, the method 900 begins at operation 910 and the input module 320 receives a plurality of user events based on a user interacting with the system 150. In one example, the user events include an event in response to the user 106 selecting a control at a remote user interface.

The method 900 continues at operation 912 and the cognitive module 340 determines that the user 106 is operating in a heuristic cognitive operating mode in any one of the ways described herein. The method 900 continues at operation 914 and the input module 320 receives a request from the user 106 to purchase an item. The method 900 continues at operation 916 and the cognitive module 340 determines whether a number of reviews for the item is below a threshold number of reviews.

In response to the number of reviews for the item being below the threshold number, the method 900 continues at operation 918 and the interface module 360 adjusts a user interface element to display the number of reviews in proximity to an average review rating. In response to the number of reviews for the item not being below the threshold number, the method 900 continues at operation 920 and the interface module 360 modifies one or more user interface elements to display the average rating for the item.

Figure 10:
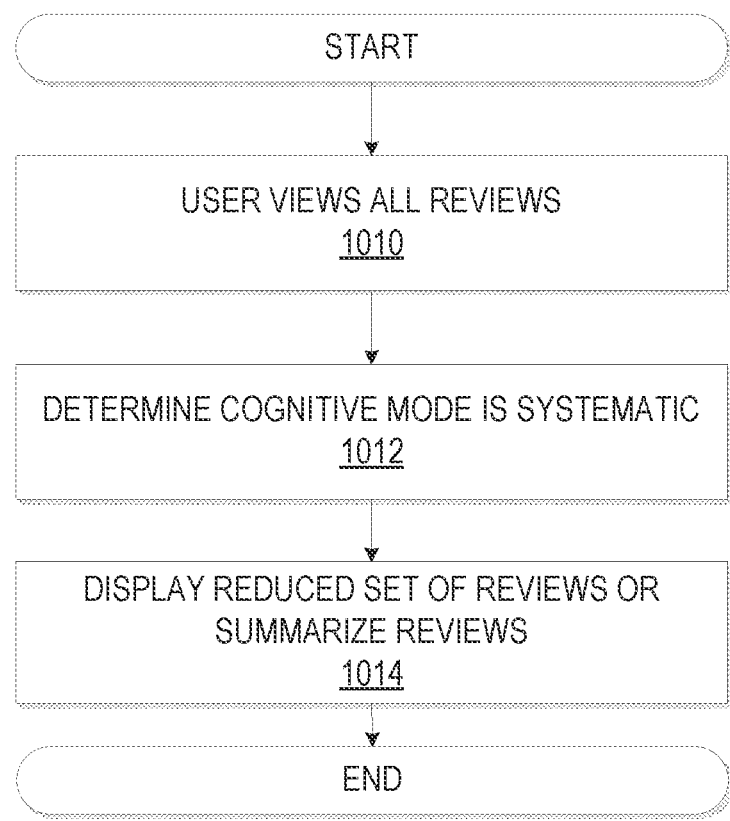
FIG. 10 is a flow chart diagram illustrating a method for adjusting an interface based on a cognitive mode.

FIG. 10 is a flow chart diagram illustrating a method 1000 for adjusting an interface based on a cognitive mode. Operations in the method 1000 may be performed by the system 150, using modules described above with respect to FIG. 3. As shown in FIG. 10, the method 1000 includes operations 1010, 1012, and 1014.

The method 1000 begins at operation 1010 and the input module 320 receives user events from a user 106 interacting with the system 150. In one example, the user 106 is performing an exhaustive review of reviews in a list of reviews for a product. For example, the user 106 may review each review in a first page of many pages of reviews. The method 1000 continues at operation 1012 and the cognitive module 340 determines that the user 106 is operating in a systematic cognitive operating mode based, at least in part, on the received user events as previously described. The method 1000 continues at operation 1014 and the interface module 360 displays a reduced set of reviews for an item being viewed by the user 106. In another example embodiment, the operation 1014 includes summarizing reviews not yet read by the user 106.

Figure 11:
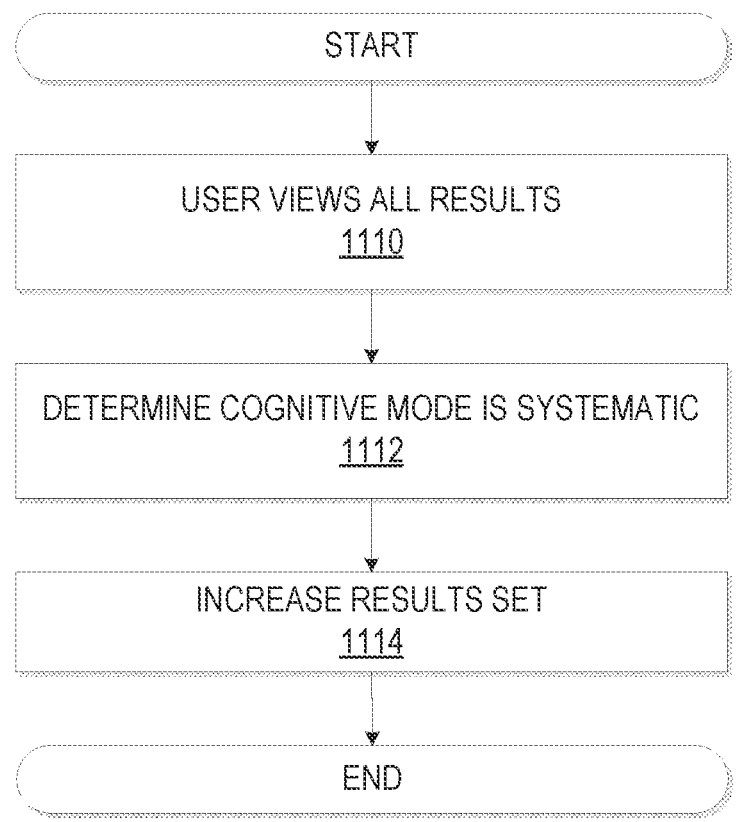
FIG. 11 is a flow chart diagram illustrating a method for adjusting an interface based on a cognitive mode.

FIG. 11 is a flow chart diagram illustrating a method 1100 for adjusting an interface based on a cognitive mode. Operations in the method 1100 may be performed by the system 150, using modules described above with respect to FIG. 3. As shown in FIG. 11, the method 1100 includes operations 1110, 1112, and 1114.

In one example embodiment of the method 1100, the method 1100 begins and at operation 1110 the user 106 views each item in a list of items returned in response to a query. For example, the input module 320 receives view events for each item in the list. The method 1100 continues at operation 1112 and the cognitive module 340 determines that the user is operating in a systematic cognitive operating mode. In response, the interface module 360 modifies one or more user interface elements to display an increased results set. In one example, the interface module 360 broadens a search for items that match a query submitted by the user 106. Displaying an increased number of results may shift the user into a heuristic cognitive operating mode because the number of results may overwhelm the user 106.

Figure 12:
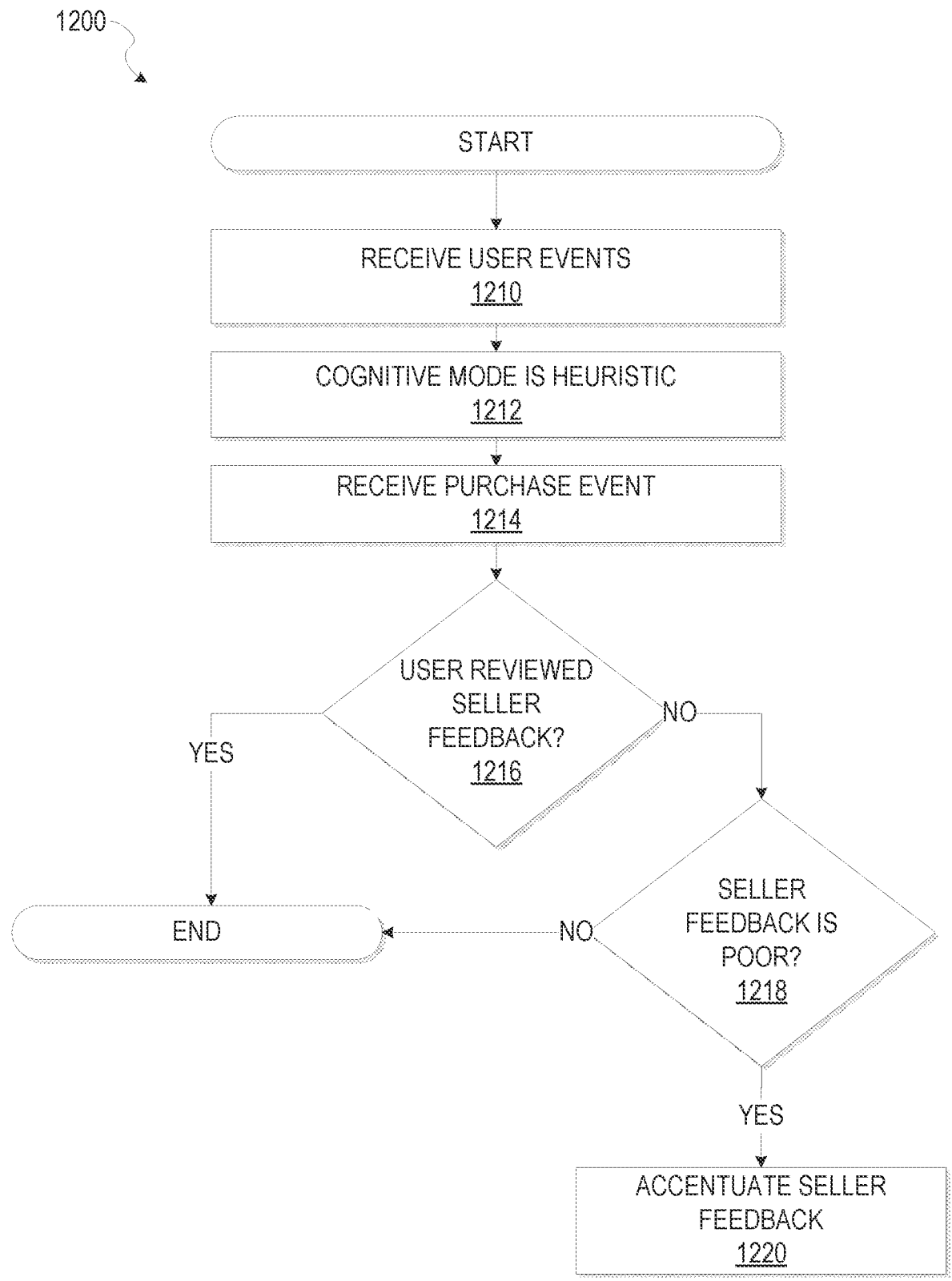
FIG. 12 is a flow chart diagram illustrating a method for adjusting an interface based on a cognitive mode.

FIG. 12 is a flow chart diagram illustrating a method for adjusting an interface based on a cognitive mode. Operations in the method 1200 may be performed by the system 150, using modules described above with respect to FIG. 3.

As shown in FIG. 12, the method 1200 includes operations 1210, 1212, 1214, 1216, 1218, and 1220.

In one example embodiment of the method 1200, the method 1200 begins and at operation 1210 the input module 320 receives one or more user events based on the user 106 interacting with the system 150. The method 1200 continues at operation 1212 and the cognitive module 340 determines that the user 106 is operating in a heuristic cognitive operating mode in any one of the ways described herein. The method 1200 continues at operation 1214 and the input module 320 receives a purchase event for an item at the network system 102 from the user 106 and/or a computing device being operated by the user 106. In one example, reception of the purchase event indicates an imminent purchase by the user 106.

The method 1200 continues at operation 1216 and the cognitive module 340 determines whether the user 106 has reviewed feedback for a seller of the item. In one example, the cognitive module 340 reviews past user events, historical events from the user, or other events to determine if any of the prior events include the user reviewing seller feedback. In one example, the user 106 reviews seller feedback by selecting a button to display the seller feedback. In response to the user 106 not having pressed the button, the cognitive module 340 determines that the user did not review the seller feedback.

In response to the user 106 reviewing the seller feedback, the method 1200 ends. In response to the user 106 not having reviewed the seller feedback, the method 1200 continues at operation 1218 and the interface module 360 determines whether the feedback for the seller is poor. In one example, a seller's feedback being poor includes the seller's feedback being in a bottom 10% of users of the network system 102. In another example, the seller's feedback being poor includes the seller's average feedback rating being below an average feedback rating for other users of the network system 102. In one example, the seller's feedback rating being poor includes the seller's feedback rating being below a threshold value or the seller not having received a feedback rating.

In response to the seller's feedback not being poor, the method 1200 ends. In response to the seller's feedback rating being poor, the method 1200 continues at operation 1220 and the interface module 360 accentuates the seller's feedback rating for display to the user before the user purchases the item.

Figure 13:
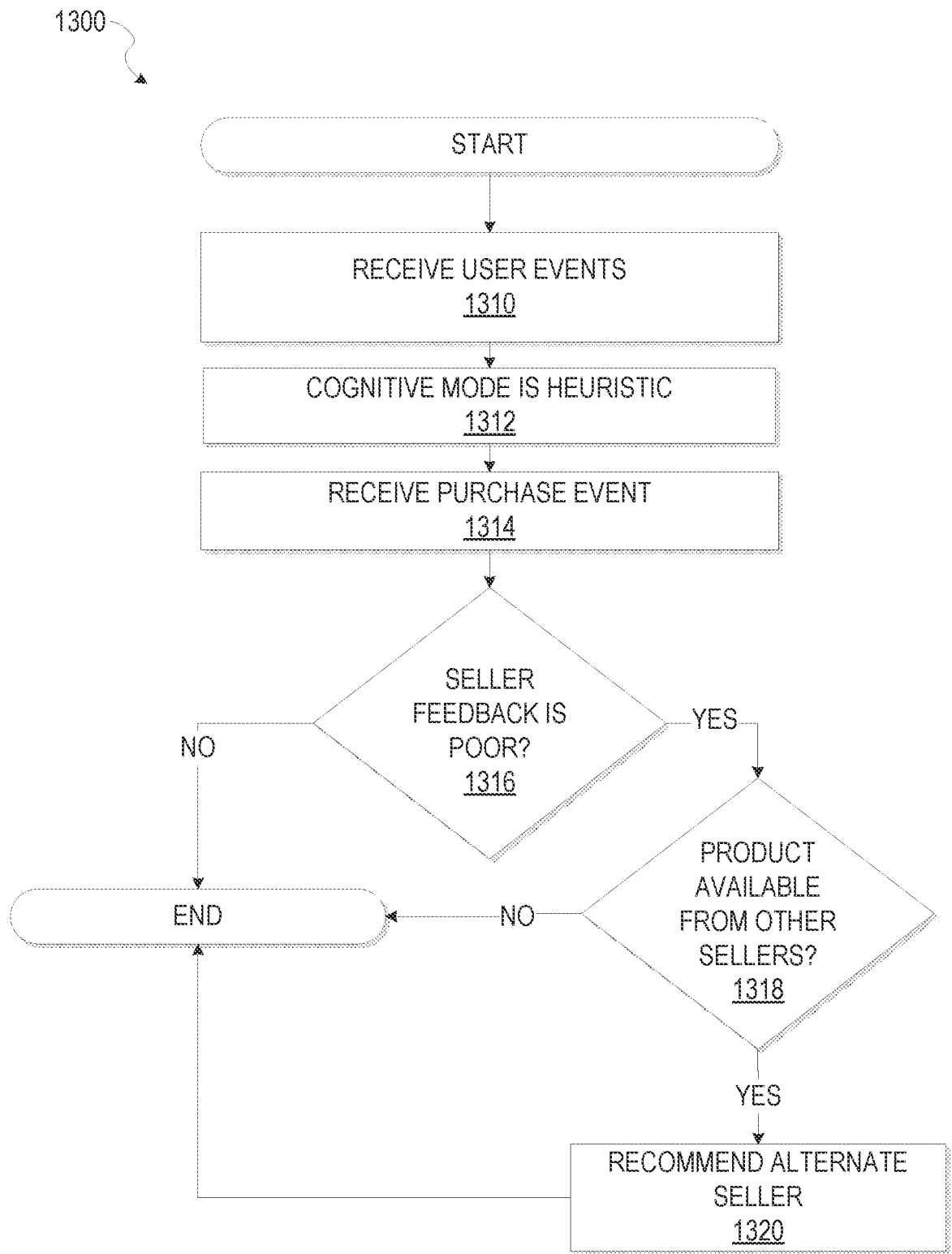
FIG. 13 is a flow chart diagram illustrating a method for adjusting an interface based on a cognitive mode.

FIG. 13 is a flow chart diagram illustrating a method 1300 for adjusting an interface based on a cognitive mode. Operations in the method 1300 may be performed by the system 150, using modules described above with respect to FIG. 3. As shown in FIG. 13, the method 1300 includes operations 1310, 1312, 1314, 1316, 1318, and 1320.

In one example embodiment of the method 1300, the method 1300 begins and at operation 1310 the input module 320 receives one or more user events based on the user 106 interacting with the system 150. The method 1300 continues at operation 1312 and the cognitive module 340 determines that the user 106 is operating in a heuristic cognitive operating mode in any one of the ways described herein. The method 1300 continues at operation 1314 and the input module 320 receives a purchase event for an item at the network system 102 from the user 106 and/or a computing device being operated by the user 106. In one example, reception of the purchase event indicates an imminent purchase by the user 106.

The method 1300 continues at operation 1316 and the cognitive module 340 determines whether the seller for the item has a poor feedback rating as previously described.

In response to the seller's feedback not being poor, the method 1300 ends. In response to the seller's feedback rating being poor, the method 1300 continues at operation 1318 and the interface module 360 determines whether the item is available from another seller with a higher feedback rating. In response to the item not being available from another seller, the method 1300 ends. In response to the item being available from an alternate seller with a higher feedback rating, the method continues at operation 1320 and the interface module 360 recommends the alternate seller to the user 106. In one example, the interface module 360 modifies a user interface element to display a message the user that includes the recommendation.

Figure 14:
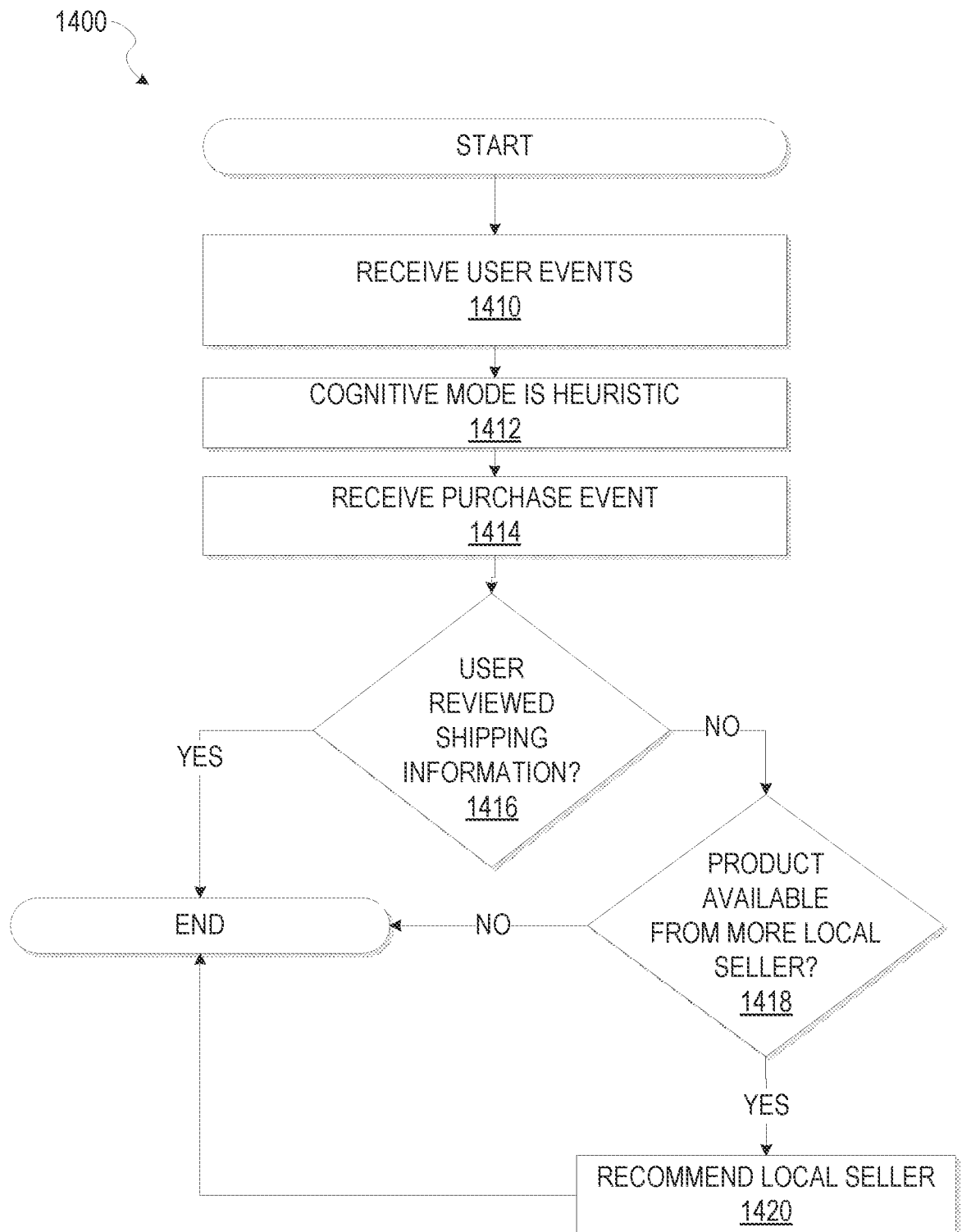
FIG. 14 is a flow chart diagram illustrating a method for adjusting an interface based on a cognitive mode.

FIG. 14 is a flow chart diagram illustrating a method for adjusting an interface based on a cognitive mode. Operations in the method 1400 may be performed by the system 150, using modules described above with respect to FIG. 3. As shown in FIG. 14, the method 1400 includes operations 1410, 1412, 1414, 1416, 1418, and 1420.

In one example embodiment of the method 1400, the method 1400 begins and at operation 1410 the input module 320 receives one or more user events by the user 106 interacting with the system 150. The method 1400 continues at operation 1412 and the cognitive module 340 determines that the user 106 is operating in a heuristic cognitive operating mode in any one of the ways described herein. The method 1400 continues at operation 1414 and the input module 320 receives a purchase event for an item at the network system 102 from the user 106 and/or a computing device being operated by the user 106. In one example, reception of the purchase event indicates an imminent purchase by the user 106.

The method 1400 continues at operation 1416 and the cognitive module 340 determines whether the user 106 has reviewed shipping information for the item. In one example, the cognitive module 340 reviews past user events, historical events from the user, or other events to determine if any of the prior events include the user reviewing the shipping information. In one example, the user 106 reviews the shipping information by selecting a button to display the seller feedback. In response to the user 106 not having pressed the button, the cognitive module 340 determines that the user did not review the shipping information. In this example, because the item will be shipped to the user 106, the shipping information is relevant to the purchase of the item.

In response to the user 106 reviewing the shipping information, the method 1400 ends. In response to the user 106 not having reviewed the relevant shipping information, the method 1400 continues at operation 1418 and the interface module 360 determines whether the product is available from a local seller.

In response to the item not being available from a local seller at the network system 102, the method 1400 ends. In response to the product being available from a local seller, the interface module 360 recommends the local seller to the user 106 before the user 106 purchases the item. In one example, the interface module 360 modifies a user interface element to display a message that recommends the seller to the user 106. This kind of recommendation increases the likelihood that the transaction between the user 106 and the seller will be satisfactory to the user 106 because the user 106 will not have to wait as long to receive the item.

Figure 15:
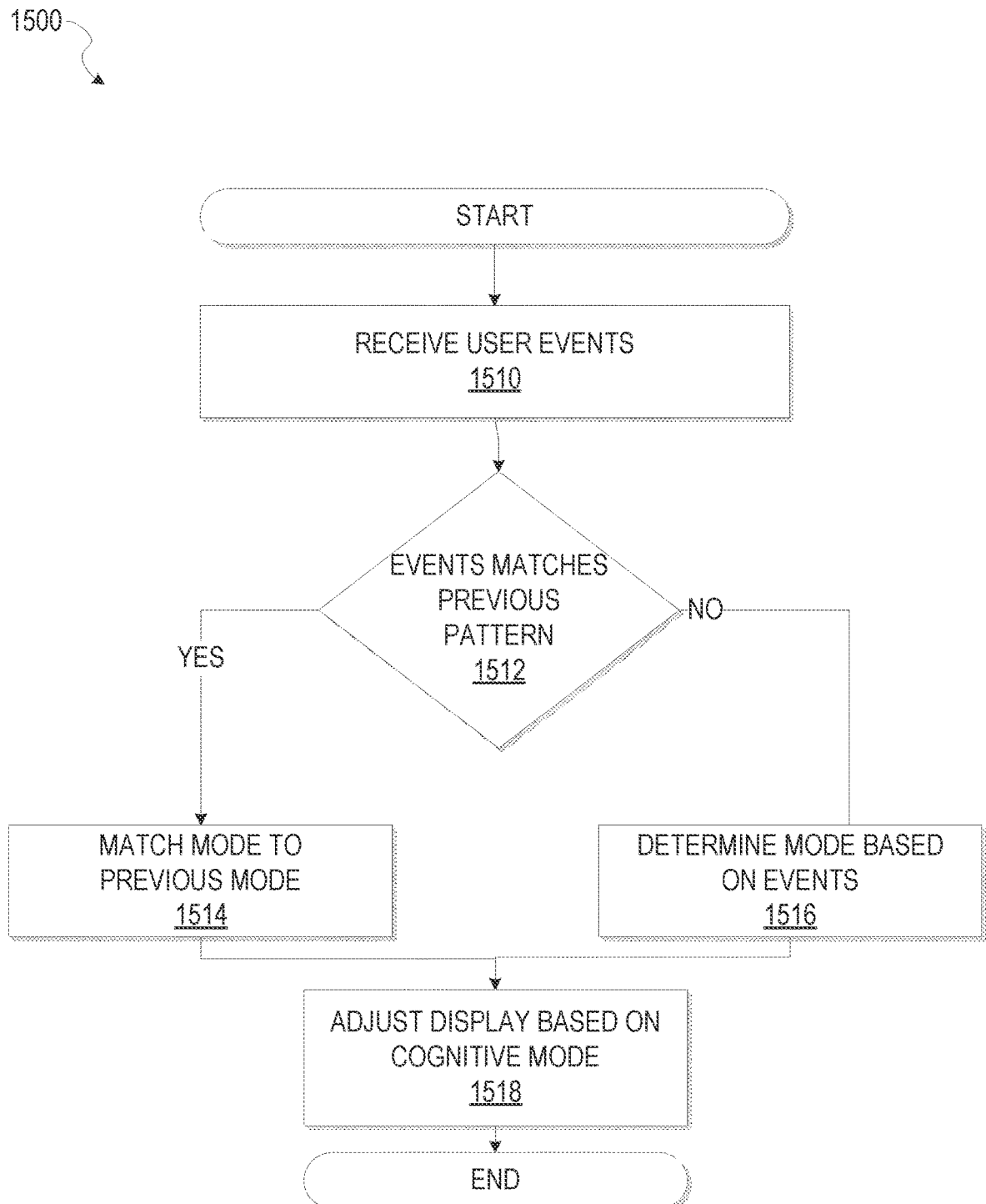
FIG. 15 is a flow chart diagram illustrating a method for adjusting an interface based on a cognitive mode.

FIG. 15 is a flow chart diagram illustrating a method 1500 for adjusting an interface based on a cognitive mode. Operations in the method 1500 may be performed by the system 150, using modules described above with respect to FIG. 3. As shown in FIG. 15, the method 1500 includes operations 1510, 1512, 1514, 1516, and 1518.

In one example embodiment of the method 1500, the method 1500 begins and at operation 1510 the input module 320 receives one or more user events by the user 106 interacting with the system 150. The method 1500 continues at operation 1512 and the cognitive module 340 determines a cognitive operating mode for the user 106 by matching the user events with historical user events.

In response to the user events matching a previous pattern of user events, the cognitive module 340 matches the cognitive operating mode for the previous user events. In one example, the cognitive module 340 determines the cognitive mode at operation 1514 based on the previous cognitive mode of the user 106. The method continues at operation 1518 as will be further described. In response to the user events not matching a previous pattern of user events, the method 1500 continues at operation 1516 and the cognitive module 340 determines the cognitive operating mode of the user 106 based on the user events. The method 1500 continues at operation 1518 and the interface module 360 alters one or more user interface elements according to the determined cognitive operating mode of the user 106.

Figure 16:
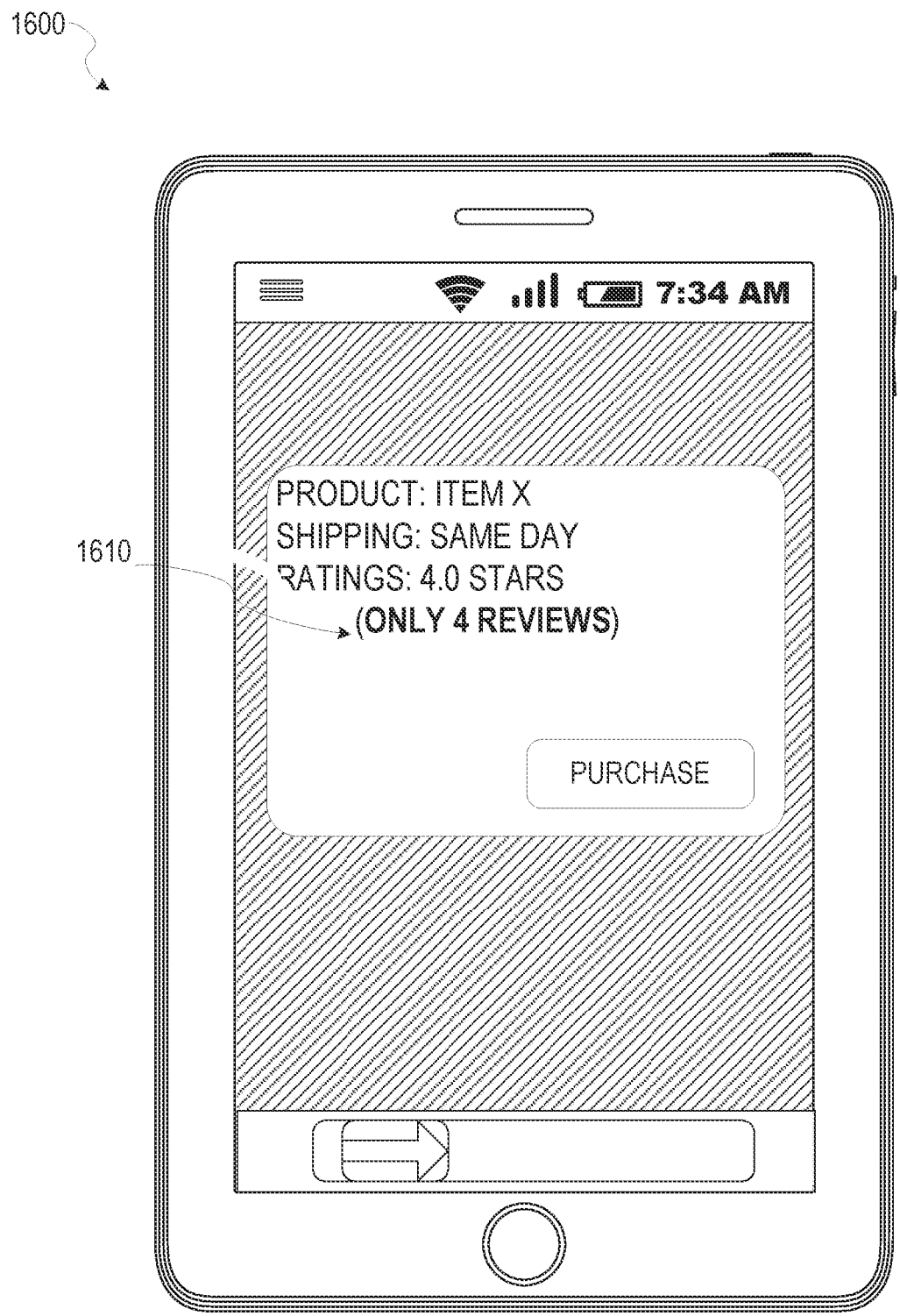
FIG. 16 is an illustration depicting a user interface, according to one example embodiment.

FIG. 16 is an illustration depicting a user interface 1600, according to one example embodiment. In this example embodiment, the cognitive module 340 has determined that the user of the interface 1600 is operating in a heuristic cognitive operating mode and the interface module 360 accentuates a number of seller reviews 1610 by bolding the font.

Figure 17:
FIG. 17 is an illustration depicting a user interface, according to one example embodiment.

FIG. 17 is an illustration depicting a user interface 1700, according to one example embodiment. In this example embodiment, the cognitive module 340 determines that the user 106 is operating in a heuristic cognitive operating mode, since the cognitive module 340 has determined that the user has not reviewed a seller feedback rating before purchasing an item. In response, the interface module 360 modifies one or more elements of the user interface 1700 to summarize the feedback rating for the seller. In this example, the interface module 360 displays that the seller's feedback rating 1710 is "very poor." In certain examples, "very poor" indicates that the seller's feedback rating is in a bottom threshold percentage of users of the network system 102. In this way, the system 150 helps protect users from transactions that may more likely result in dissatisfaction because of a seller's very poor feedback rating.

Figure 18:
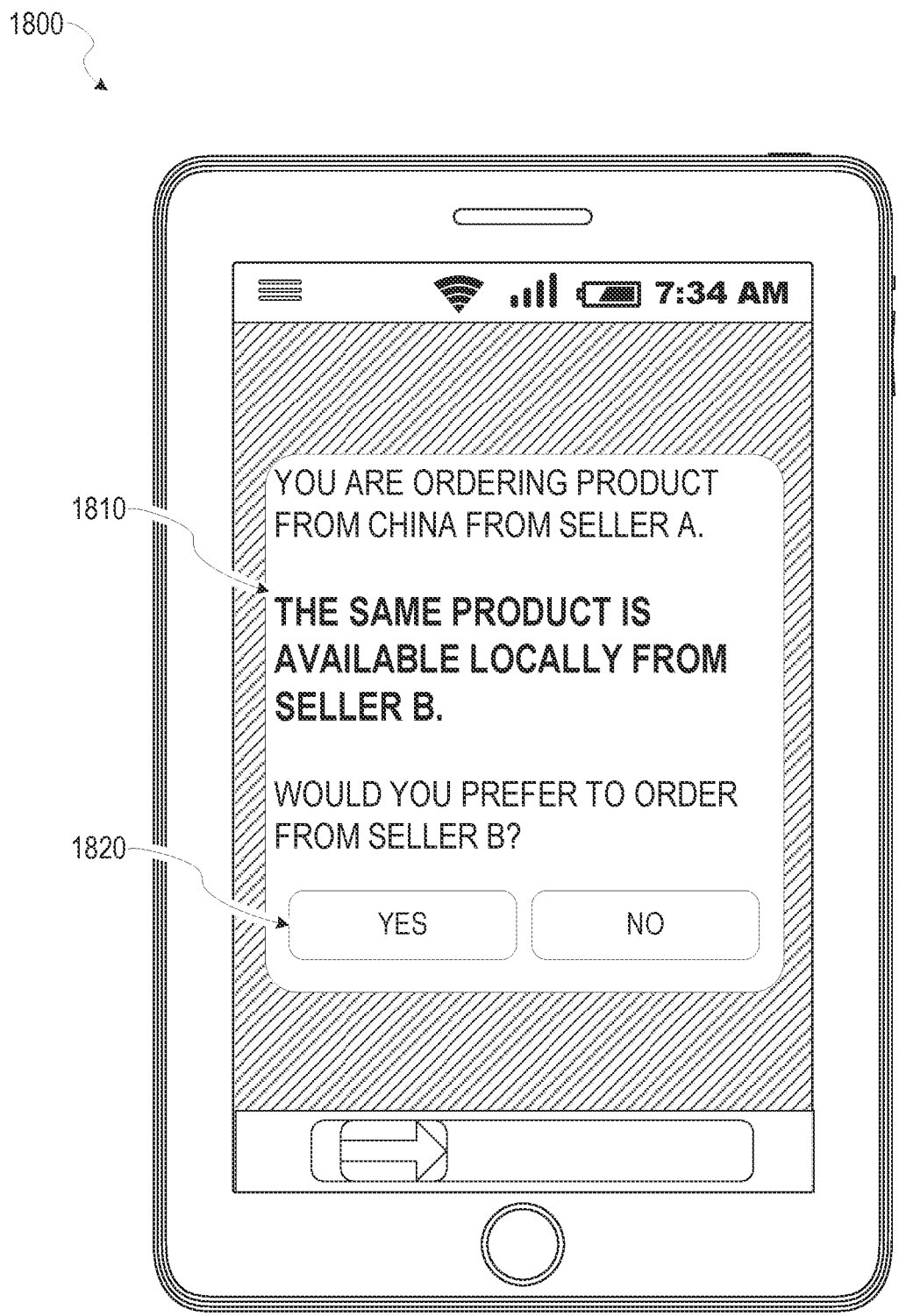
FIG. 18 is an illustration depicting a user interface, according to one example embodiment.

FIG. 18 is an illustration depicting a user interface 1800, according to one example embodiment. In this example embodiment, the cognitive module 340 has determined that the user is operating in a heuristic cognitive operating mode. In response to the user 106 requesting purchase of an item from a remote location (e.g., a foreign country) and the cognitive module 340 also determining that the same item is available from a local seller (e.g., the same municipality as the user), the interface module 360 modifies the user interface 1800 to include a message 1810 to the user 106 that the same item is available from a local seller. The interface module 360 may also ask the user 106 if they would prefer to purchase from the local seller by displaying one or more buttons 1820.

Figure 19:
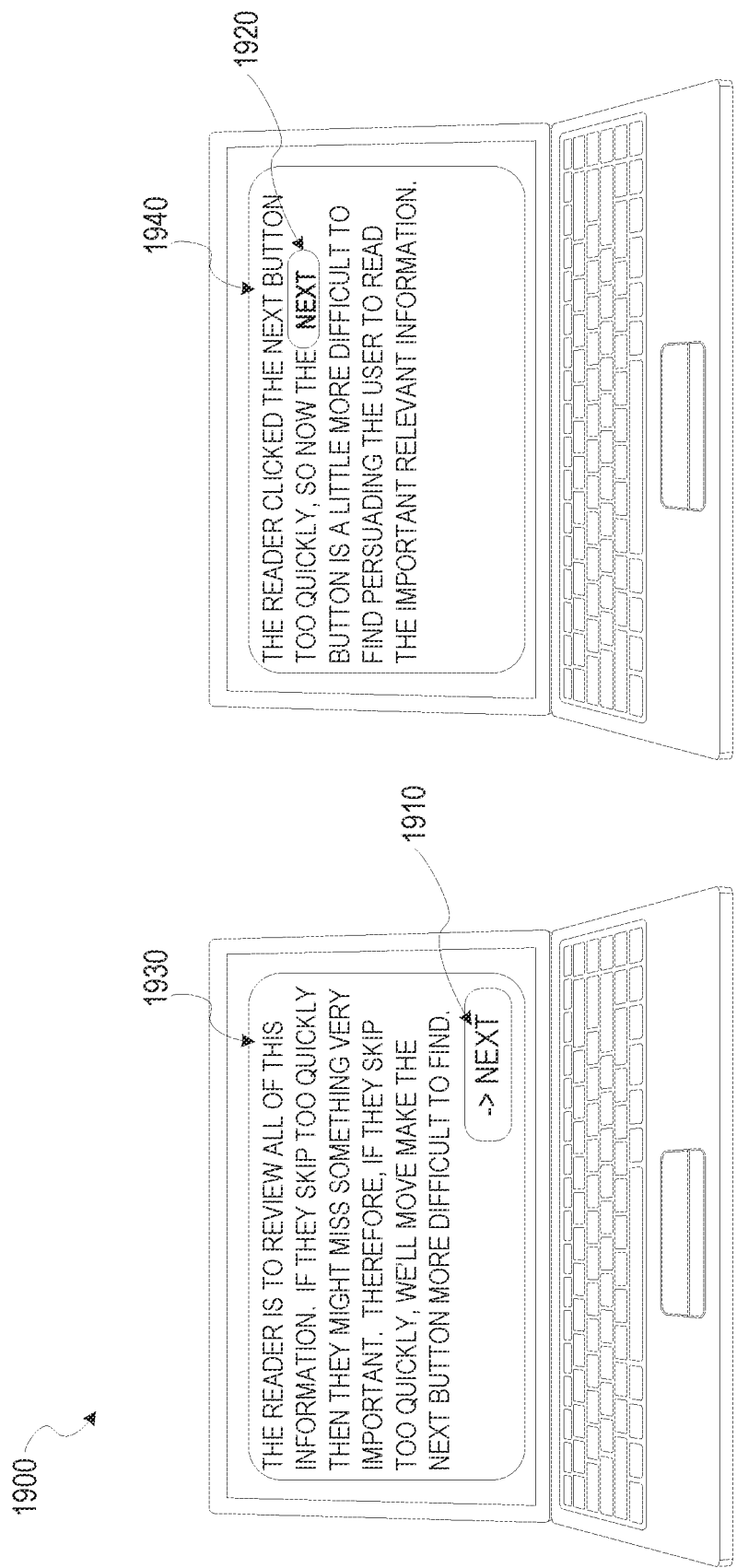
FIG. 19 is an illustration depicting a user interface, according to one example embodiment.

FIG. 19 is an illustration 1900 depicting a user interface, according to one example embodiment. In this example embodiment, the cognitive module 340 determines that the user is operating in a heuristic cognitive operating mode based, at least in part, on the timing of when the user 106 selects the next button 1910 at a first interface 1930. In response to the user selecting the next button 1910 too quickly, at a next interface 1940, the interface module 360 modifies the interface 1940 by changing the location of the next button 1920. In this way, the user 106 is dissuaded from clicking subsequent next buttons too quickly and is more likely to read the relevant information displayed at either interface 1930, 1940.

Machine and Software Architecture

The modules, methods, applications and so forth described in conjunction with FIGS. 1-19 are implemented in some embodiments in the context of a machine and associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software Architecture

Figure 20:
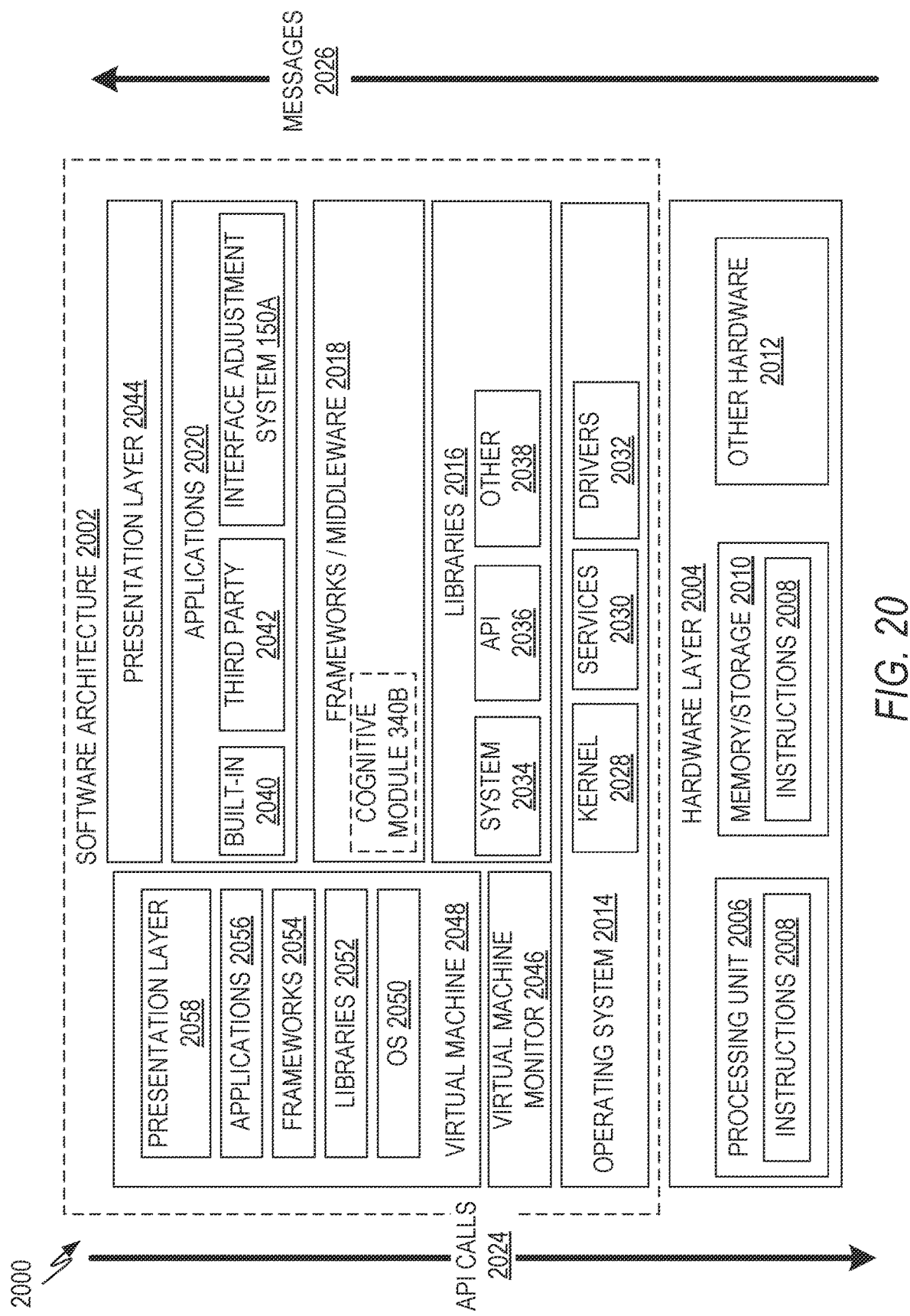
FIG. 20 is a block diagram illustrating an example of a software architecture that may be installed on a machine, according to some example embodiments.

FIG. 20 is a block diagram illustrating an example of a software architecture 2000 that may be installed on a machine, according to some example embodiments. The software architecture 2000 may be used in conjunction with various hardware architectures herein described. FIG. 20 is merely a non-limiting example of a software architecture and it will be appreciated that many other architectures may be implemented to facilitate the functionality described herein. The software architecture 2000 may be executing on hardware such as machine 2100 of FIG. 21 that includes, among other things, processors 2110, memory/storage 2130, and I/O components 2150. A representative hardware layer 2004 is illustrated and can represent, for example, the machine 2100 of FIG. 14. The representative hardware layer 2004 comprises one or more processing units 2006 having associated executable instructions 2008. Executable instructions 2008 represent the executable instructions of the software architecture 2002, including implementation of the methods, modules, and so forth of FIG. 3. Hardware layer 2004 also includes memory and/or storage modules 2010, which also have executable instructions 2008. Hardware layer 2004 may also comprise other hardware as indicated by 2012, which represents any other hardware of the hardware layer 2004, such as the other hardware illustrated as part of machine 2100.

In the example architecture of FIG. 20, the software architecture 2002 may be conceptualized as a stack of layers where each layer provides particular functionality. For example, the software architecture 2002 may include layers such as an operating system 2014, libraries 2016, frameworks/middleware 2018, applications 2020, and presentation layer 2022. Operationally, the applications 2020 and/or other components within the layers may invoke API calls 2024 through the software stack and receive a response, returned values, and so forth illustrated as messages 2026 in response to the API calls 2024. The layers illustrated are representative in nature and not all software architectures have all layers. For example, some mobile or special purpose operating systems may not provide a frameworks/middleware layer 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030 and/or drivers 2032). The libraries 2016 may include system 2034 libraries (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and/or three dimensional graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be utilized by the applications 2020 and/or other software components/modules. For example, the frameworks 2018 may provide various graphic user interface (GUI) functions, high-level resource management, high-level location services, and so forth. The frameworks 2018 may provide a broad spectrum of other APIs that may be utilized by the applications 2020 and/or other software components/modules, some of which may be specific to a particular operating system or platform. In one specific example, the cognitive module 340 is implemented as part of middleware. In this example, the cognitive module 340 may determine a cognitive operating mode of the user 106 based, at least in part, on user events initiated via any of the applications 2020.

The applications 2020 include built-in applications 2040 and/or third party applications 2042. Examples of representative built-in applications 2040 may include, but are not limited to, a contacts application, a browser application, a book reader application, a location application, a media application, a messaging application, and a game application, or other, or the like. Third party applications 2042 may include any of the built in applications as well as a broad assortment of other applications. In a specific example, the third party application 2042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 2042 may invoke the API calls 2024 provided by the mobile operating system such as operating system 2014 to facilitate functionality described herein. In a further example, the interface adjustment system 150A is implemented as an application 2020. In this example, the user events are based on the user 106 interacting with the network system 102 using the application that includes the interface adjustment system 150A.

The applications 2020 may utilize built in operating system functions (e.g., kernel 2028, services 2030, and/or drivers 2032), libraries (e.g., system 2034, API libraries 2036, and other libraries 2038), frameworks/middleware 2018 to create user interfaces to interact with users of the system. Alternatively, or additionally, in some systems, interactions with a user may occur through a presentation layer, such as presentation layer 2044. In these systems, the application/module "logic" can be separated from the aspects of the application/module that interact with a user.

Figure 21:
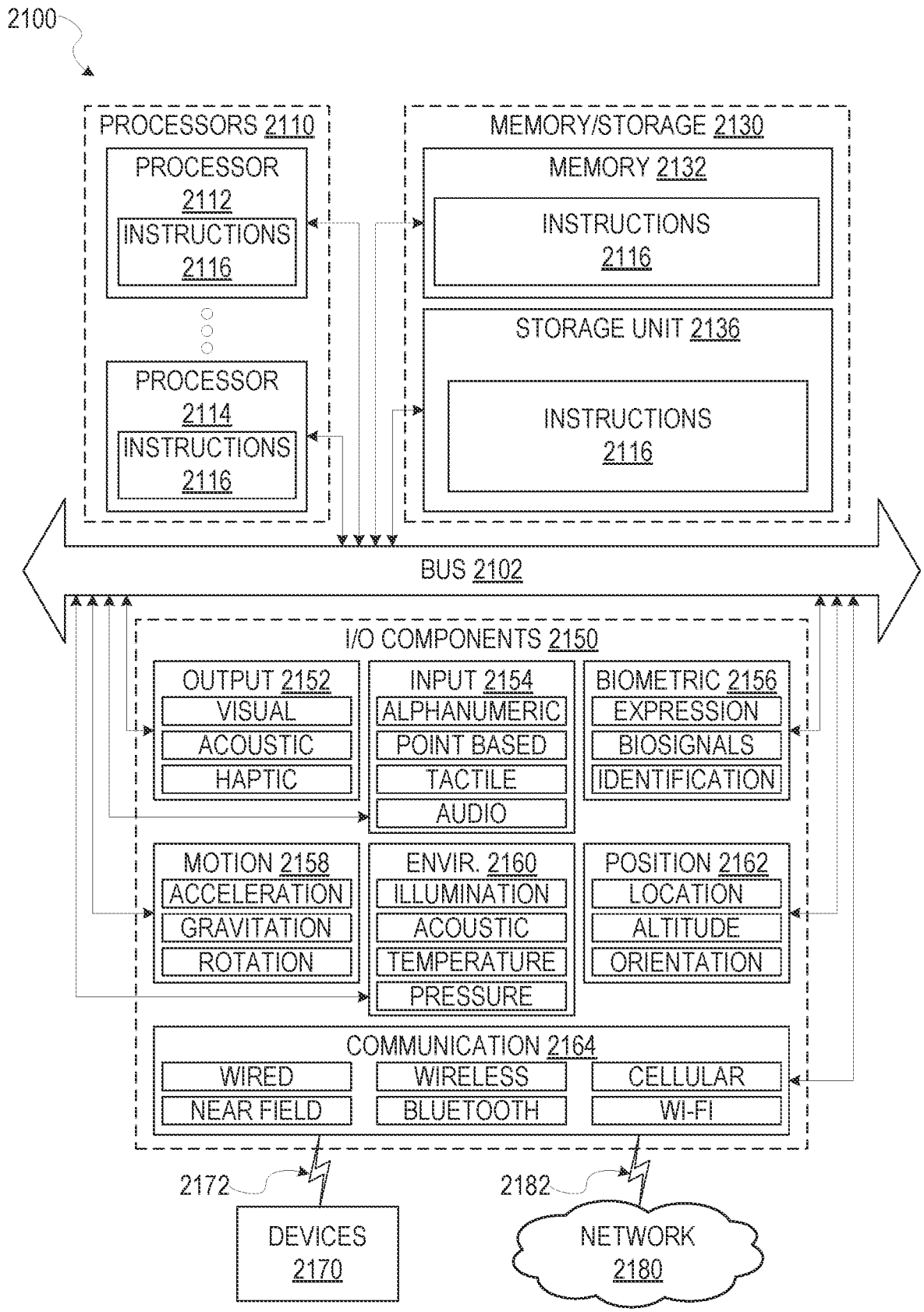
FIG. 21 illustrates a diagrammatic representation of a machine in the form of a computer system within which a set of instructions may be executed for causing the machine to perform any one or more of the methodologies discussed herein, according to an example embodiment.

Some software architectures utilize virtual machines. In the example of FIG. 20, this is illustrated by virtual machine 2048. A virtual machine creates a software environment where applications/modules can execute as if they were executing on a hardware machine (such as the machine of FIG. 21, for example). A virtual machine is hosted by a host operating system (operating system 2014 in FIG. 20) and typically, although not always, has a virtual machine monitor 2046, which manages the operation of the virtual machine as well as the interface with the host operating system (i.e., operating system 2014). A software architecture executes within the virtual machine such as an operating system 2050, libraries 2052, frameworks/middleware 2054, applications 2056 and/or presentation layer 2058. These layers of software architecture executing within the virtual machine 2048 can be the same as corresponding layers previously described or may be different Example Machine Architecture and Machine-Readable Medium FIG. 21 is a block diagram illustrating components of a machine 2100, according to some example embodiments, able to read instructions from a machine-readable medium (e.g., a machine-readable storage medium) and perform any one or more of the methodologies discussed herein. Specifically, FIG. 21 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed.

For example the instructions may cause the machine to execute the flow diagrams of FIGS. 4-15. Additionally, or alternatively, the instructions may implement the input module 320, the cognitive module 340 and/or the interface module 360. The instructions transform the general, non-programmed machine into a particular machine programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory/storage 2130, and I/O components 2150, which may be configured to communicate with each other such as via a bus 2102. In an example embodiment, the processors 2110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 2112 and processor 2114 that may execute instructions 2116. The term "processor" is intended to include multi-core processor that may comprise two or more independent processors (sometimes referred to as "cores") that may execute instructions contemporaneously. Although FIG. 21 shows multiple processors, the machine 2100 may include a single processor with a single core, a single processor with multiple cores (e.g., a multi-core process), multiple processors with a single core, multiple processors with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116 embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of processors 2110 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine will depend on the type of machine. For example, portable machines such as mobile phones will likely include a touch input device or other such input mechanisms, while a headless server machine will likely not include such a touch input device. It will be appreciated that the I/O components 2150 may include many other components that are not shown in FIG. 21. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via coupling 2182 and coupling 2172, respectively. For example, the communication components 2164 may include a network interface component or other suitable device to interface with the network 2180. In further examples, communication components 2164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2170 may be another machine or any of a wide variety of peripheral devices (e.g., a peripheral device coupled via a USB).

Moreover, the communication components 2164 may detect identifiers or include components operable to detect identifiers. For example, the communication components 2164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 2180 may be an ad hoc network, an intranet, an extranet, a VPN, a LAN, a WLAN, a WAN, a WWAN, a (MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or other type of cellular or wireless coupling. In this example, the coupling 2182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to devices 2170. The term "transmission medium" shall be taken to include any intangible medium that is capable of storing, encoding, or carrying instructions 2116 for execution by the machine 2100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
outputting a user interface that displays information describing at least one commitment or obligation between a user and an entity, the information including a sequence of different portions that are organized in a predefined order for presentation via the user interface;
monitoring a plurality of user events initiated by user input, each of the plurality of user inputs causing the user interface to display, based on the predefined order, a subsequent one of the sequence of different portions of the information describing the at least one commitment or obligation;

identifying a portion of the information describing the at least one commitment or obligation that was displayed during the plurality of user events and was not reviewed by the user during the plurality of user events based at least in part on a frequency of the plurality of the user events detected during the monitoring;

responsive to identifying the portion of information describing the at least one commitment or obligation that was displayed during the plurality of user events and was not reviewed by the user during the plurality of user events, generating a modified version of the portion of information, the modified version of the portion of the information differing from the portion of information by increasing a font size of the portion of information or by bolding the portion of information; and modifying an element in the user interface prior to the user entering into the at least one commitment or obligation, the modifying including:

generating accentuated information that includes the modified version of the portion of information describing the at least one commitment or obligation that was not reviewed by the user during the plurality of events; and causing the element to display the accentuated information and exclude a different portion of the information describing the at least one commitment or obligation that was reviewed by the user during the plurality of user events.

2. The method of claim 1, wherein identifying the portion of the information describing the at least one commitment or obligation that was displayed during the plurality of user events and was not reviewed by the user during the plurality of user events comprises determining that a threshold number of the plurality of user events were initiated by the user during the display of the portion of information.

3. The method of claim 1, wherein identifying the portion of the information describing the at least one commitment or obligation that was displayed during the plurality of user events and was not reviewed by the user during the plurality of user events is performed based on a time of day at which the plurality of user events are initiated by the user.

4. The method of claim 1, wherein identifying the portion of the information describing the at least one commitment or obligation that was displayed during the plurality of user events and was not reviewed by the user during the plurality of user events is performed based on a user session duration during which the plurality of user events are initiated by the user.

5. The method of claim 1, wherein identifying the portion of the information describing the at least one commitment or obligation that was displayed during the plurality of user events and was not reviewed by the user during the plurality of user events is performed based on a type of device at which the plurality of user events are initiated.

6. The method of claim 1, the modifying further including generating a summary of the portion of information that was displayed during the plurality of user events and was not reviewed by the user during the plurality of user events and causing the element to display the summary of the portion of information that was displayed during the plurality of user events and was not reviewed by the user during the plurality of user events.

7. The method of claim 1, wherein the plurality of user events comprise at least one of button selections, link selections, or graphical user interface manipulations.

8. A system comprising:
one or more processors; and
a computer-readable storage medium storing instructions that are executable by the one or more processors to perform operations comprising:

outputting a user interface that displays information describing at least one commitment or obligation between a user and an entity, the information including a sequence of different portions that are organized in a predefined order for presentation via the user interface;

monitoring a plurality of user events initiated by user input, each of the plurality of user inputs causing the user interface to display, based on the predefined order, a subsequent one of the sequence of different portions of the information describing the at least one commitment or obligation;

identifying a portion of the information describing the at least one commitment or obligation that was displayed during the plurality of user events and was not reviewed by the user during the plurality of user events based at least in part on a frequency of the plurality of the user events detected during the monitoring;

responsive to identifying the portion of information describing the at least one commitment or obligation that was displayed during the plurality of user events and was not reviewed by the user during the plurality of user events, generating a modified version of the portion of information, the modified version of the portion of the information differing from the portion of information by increasing a font size of the portion of information or by bolding the portion of information; and modifying an element in the user interface prior to the user entering into the at least one commitment or obligation, the modifying including:

generating accentuated information that includes the modified version of the portion of information describing the at least one commitment or obligation that was not reviewed by the user during the plurality of events; and causing the element to display the accentuated information and exclude a different portion of the information describing the at least one commitment or obligation that was reviewed by the user during the plurality of user events.

9. The system of claim 8, wherein identifying the portion of the information describing the at least one commitment or obligation that was displayed during the plurality of user events and was not reviewed by the user during the plurality of user events comprises determining that a threshold number of the plurality of user events were initiated by the user during the display of the portion of information.

10. The system of claim 8, wherein identifying the portion of the information describing the at least one commitment or obligation that was displayed during the plurality of user events and was not reviewed by the user during the plurality of user events is performed based on a time of day at which the plurality of user events are initiated by the user.

11. The system of claim 8, wherein identifying the portion of the information describing the at least one commitment or obligation that was displayed during the plurality of user events and was not reviewed by the user during the plurality of user events is performed based on a user session duration during which the plurality of user events are initiated by the user.

12. The system of claim 8, wherein identifying the portion of the information describing the at least one commitment or obligation that was displayed during the plurality of user events and was not reviewed by the user during the plurality of user events is performed based on a type of device at which the plurality of user events are initiated.

13. The system of claim 8, the modifying further including generating a summary of the portion of information that was displayed during the plurality of user events and was not reviewed by the user during the plurality of user events and causing the element to display the summary of the portion of information that was displayed during the plurality of user events and was not reviewed by the user during the plurality of user events.

14. The system of claim 8, wherein the plurality of user events comprise at least one of button selections, link selections, or graphical user interface manipulations.

15. A machine-readable medium storing instructions that, when executed by at least one hardware processor of a machine, cause the machine to perform operations comprising:

outputting a user interface that displays information describing at least one commitment or obligation between a user and an entity, the information including a sequence of different portions that are organized in a predefined order for presentation via the user interface;

monitoring a plurality of user events initiated by user input, each of the plurality of user inputs causing the user interface to display, based on the predefined order, a subsequent one of the sequence of different portions of the information describing the at least one commitment or obligation;

identifying a portion of the information describing the at least one commitment or obligation that was displayed during the plurality of user events and was not reviewed by the user during the plurality of user events based at least in part on a frequency of the plurality of the user events detected during the monitoring;

responsive to identifying the portion of information describing the at least one commitment or obligation that was displayed during the plurality of user events and was not reviewed by the user during the plurality of user events, generating a modified version of the portion of information, the modified version of the portion of the information differing from the portion of information by increasing a font size of the portion of information or by bolding the portion of information; and modifying an element in the user interface prior to the user entering into the at least one commitment or obligation, the modifying including:

generating accentuated information that includes the modified version of the portion of information describing the at least one commitment or obligation that was not reviewed by the user during the plurality of events; and causing the element to display the accentuated information and exclude a different portion of the information describing the at least one commitment or obligation that was reviewed by the user during the plurality of user events.

16. The machine-readable medium of claim 15, wherein identifying the portion of the information describing the at least one commitment or obligation that was displayed during the plurality of user events and was not reviewed by the user during the plurality of user events comprises determining that a threshold number of the plurality of user events were initiated by the user during the display of the portion of information.

17. The machine-readable medium of claim 15, wherein identifying the portion of the information describing the at least one commitment or obligation that was displayed during the plurality of user events and was not reviewed by the user during the plurality of user events is performed based on a time of day at which the plurality of user events are initiated by the user.

18. The machine-readable medium of claim 15, wherein identifying the portion of the information describing the at least one commitment or obligation that was displayed during the plurality of user events and was not reviewed by the user during the plurality of user events is performed based on a user session duration during which the plurality of user events are initiated by the user.

19. The machine-readable medium of claim 15, wherein identifying the portion of the information describing the at least one commitment or obligation that was displayed during the plurality of user events and was not reviewed by the user during the plurality of user events is performed based on a type of device at which the plurality of user events are initiated.

20. The machine-readable medium of claim 15, the modifying further including generating a summary of the portion of information that was displayed during the plurality of user events and was not reviewed by the user during the plurality of user events and causing the element to display the summary of the portion of information that was displayed during the plurality of user events and was not reviewed by the user during the plurality of user events.

* * * * *